United States Patent
Axmon et al.

(10) Patent No.: US 8,892,103 B2
(45) Date of Patent: Nov. 18, 2014

(54) METHODS AND NODES SUPPORTING CELL CHANGE

(75) Inventors: Joakim Axmon, Kävlinge (SE); Muhammad Ali Kazmi, Bromma (SE); Walter Gerhard Alois Müller, Upplands Väsby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 44 days.

(21) Appl. No.: 13/643,193

(22) PCT Filed: May 4, 2012

(86) PCT No.: PCT/SE2012/050472
§ 371 (c)(1),
(2), (4) Date: Oct. 24, 2012

(87) PCT Pub. No.: WO2012/154112
PCT Pub. Date: Nov. 15, 2012

(65) Prior Publication Data
US 2013/0150054 A1    Jun. 13, 2013

Related U.S. Application Data

(60) Provisional application No. 61/483,217, filed on May 6, 2011.

(51) Int. Cl.
*H04W 36/00* (2009.01)
*H04W 4/00* (2009.01)
*H04W 36/32* (2009.01)

(52) U.S. Cl.
CPC ................... *H04W 36/32* (2013.01)
USPC .................................... 455/440; 370/331

(58) Field of Classification Search
CPC ........................................... H04W 36/32
USPC ................. 455/436, 437, 440; 370/331
See application file for complete search history.

(56) References Cited

U.S. PATENT DOCUMENTS

| 6,125,278 | A * | 9/2000 | Wieczorek et al. | 455/437 |
| 6,639,904 | B1 * | 10/2003 | Boyer et al. | 370/329 |
| 2002/0034947 | A1 * | 3/2002 | Soliman | 455/436 |

(Continued)

FOREIGN PATENT DOCUMENTS

| GB | 2389005 A | 11/2003 | | |
| WO | 02093955 A1 | 11/2002 | | |
| WO | WO 2012/148410 A1 * | 10/2012 | ............ | H04W 36/14 |

*Primary Examiner* — Christopher M Brandt
(74) *Attorney, Agent, or Firm* — Coats & Bennett, PLLC

(57) ABSTRACT

The invention relates to a method for supporting cell change between frequency layers. The method is performed in a UE and/or a RN node of a wireless communication network deploying two frequency layers. The RN node serves a UE in a cell of a first of the two frequency layers. The UE is configured to perform measurements on the first frequency layer, and to exclude measurements on a second of the two frequency layers. The method comprises receiving (610) measurement results from the UE, for measurements performed on a cell of the first frequency layer, determining (620) a location of the UE based on the measurement results, assessing (630) a coverage of a target cell of the second frequency layer based on the location and a coverage map for the two frequency layers, and determining (640) whether to change to the target cell based on the assessment.

30 Claims, 15 Drawing Sheets

(56) References Cited

U.S. PATENT DOCUMENTS

| | | | |
|---|---|---|---|
| 2002/0187780 A1* | 12/2002 | Souissi | 455/426 |
| 2005/0255856 A1* | 11/2005 | Griffin et al. | 455/456.1 |
| 2006/0227744 A1* | 10/2006 | Metke et al. | 370/331 |
| 2008/0004000 A1* | 1/2008 | Boss et al. | 455/423 |
| 2008/0084858 A1* | 4/2008 | Hart et al. | 370/342 |
| 2010/0120437 A1* | 5/2010 | Foster et al. | 455/444 |
| 2012/0258715 A1* | 10/2012 | Souissi et al. | 455/436 |
| 2012/0276901 A1* | 11/2012 | Kruglick | 455/436 |

* cited by examiner 3G cell on carrier F1

4G cell on carrier F2

METHODS AND NODES SUPPORTING CELL CHANGE

TECHNICAL FIELD

The disclosure relates to cell change, and more specifically to a method for supporting cell change between frequency layers in a UE and/or in a radio network node of a wireless communication network deploying at least two frequency layers. The disclosure also relates to the UE and the radio network node configured to support cell change.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. High Speed Downlink Packet Access (HSDPA) and High Speed Uplink Packet Access (HSUPA), together referred to as High Speed Packet Access (HSPA), are also mobile communication protocols developed to cope with higher data rates than original UMTS protocols were capable of. The Universal Terrestrial Radio Access (UTRA) Network (UTRAN) is the radio access network of a UMTS and Evolved UTRAN (E-UTRAN) is the radio access network of an LTE system. In an UTRAN and an E-UTRAN, a User Equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE.

FIG. 1a illustrates a radio access network with an RBS 101 that serves a UE 103 in a cell 105. In UMTS, also referred to as a 3G system, a Radio Network Controller (RNC) 106 controls the RBS 101 and other neighboring RBSs, and is, among other things, in charge of management of radio resources in cells for which the RNC is responsible. The RNC is in turn also connected to the core network. In GSM, also referred to as a 2G system, the node controlling the RBS 101 is called a Base Station Controller (BSC) 106. FIG. 1b illustrates a radio access network in an LTE system, also referred to as a 4G system. An eNB 101a serves a UE 103 in the cell 105a. The eNB 101a is directly connected to the core network. The eNB 101a is also connected via an X2 interface to a neighboring eNB 101b serving another cell 105b.

Signal Measurements for Mobility

Signal measurements performed by a UE can be used for various purposes. In particular, these measurements may be used for mobility-related tasks such as cell selection and reselection and handover, but also for positioning, Self-Organized Network (SON) management, network planning, and Minimization of Drive Tests (MDT). Signal strength and signal quality are the general parameters used for signal measurements.

In UTRAN, the following three downlink neighbor cell measurements are specified primarily for mobility purposes:
 Common Pilot Channel (CPICH) Received Signal Code Power (RSCP)
 UTRA carrier Received Signal Strength Indicator (RSSI)
 CPICH Ec/No, where CPICH Ec/No=CPICH RSCP/carrier RSSI The RSCP is measured by the UE on a cell-level basis, using the CPICH. The UTRA carrier RSSI is measured over the entire carrier. It corresponds to the total received power and noise from all cells including serving cells on the same carrier. The above CPICH measurements are the main quantities used for mobility decisions.

In E-UTRAN the following two downlink neighbor cell measurements are specified, also primarily for mobility purposes:
 Reference Symbol Received Power (RSRP)
 Reference Symbol Received Quality (RSRQ), where RSRQ=RSRP/carrier RSSI RSRP in E-UTRAN is solely measured by the UE on a cell-level basis, using reference symbols (RS). The E-UTRA carrier RSSI is measured over the configured measurement bandwidth up to the entire carrier bandwidth. Again, the RSSI is the total received power and noise from all cells, including serving cells, on the same carrier. These two RS based measurements are also the main quantities that are likely to be used for the mobility decisions.

In GSM the following measurement is specified:
 GSM Broadcast Channel (BCCH) carrier RSSI
 CDMA-2000 1xRTT is a 3G wireless technology based on Code Division Multiple Access (CDMA). CDMA-2000 1xRTT is a CDMA version of the IMT-2000 standard which was developed by the International Telecommunication Union (ITU). In cdma2000 1 x RTT system the following quality measurement for mobility is specified:
 CDMA2000 1xRTT Pilot Strength In CDMA-2000 High Rate Packet Data (HRPD) system the following quality measurement for mobility is specified:
 CDMA2000 HRDP Pilot Strength IEEE 802.16 is a series of Wireless Broadband standards authored by the Institute of Electrical and Electronics Engineers (IEEE). In WiMAX (Worldwide Interoperability for Microwave Access) IEEE 802.16 systems the following measurements are used for mobility:
 WiMAX Preamble Carrier to Interference and Noise Ratio (CINR)
 WiMAX RSSI WiMAX Preamble CINR is the CINR of the WiMAX downlink preamble, measured by the UE for a particular base station. This measurement quantity provides information on the actual operating condition of the receiver, including interference and noise levels, and signal strength. It therefore depicts the cell quality and is analogous to RSRQ and CPICH Ec/No in E-UTRAN and UTRAN respectively.

WiMAX RSSI is the Received Signal Strength Indicator measured by the UE from the downlink preamble for a particular base station. It corresponds to signal strength measurements RSCP in UTRAN or RSRP in E-UTRAN.

Neighbor cell measurements are typically averaged over a long time period to filter out the effect of fast fading. The measurements may e.g. be averaged over a time period in the order of 200 milliseconds or even longer. There is also a requirement on the UE to measure and report neighbor cell measurements such as RSRP and RSRQ in E-UTRAN for a certain minimum number of cells. In both UTRAN and E-UTRAN the requirement is to measure eight cells, comprising one serving and seven neighbor cells, on the serving carrier frequency. Such a measurement is commonly termed an intra-frequency measurement.

Timing Measurements

UE timing measurements are e.g. used for fingerprinting positioning and Observed Time Difference Of Arrival (OT-DOA) in LTE. However, such measurements may also be used for mobility purposes, network planning, SON, and MDT.

The following non-satellite based UE timing measurements are currently standardized and can be used at least for positioning purposes in LTE:

UE Rx-Tx time difference, currently defined only for intra-frequency measurements. The UE Rx-Tx time difference is defined as TUE-Rx—TUE-Tx, where TUE-Rx is the UE received timing of downlink radio frame number i from the serving cell, defined by the first detected path in time, and TUE-Tx is the UE transmit timing of uplink radio frame number i.

Reference Signal Time Difference (RSTD), defined for intra- and inter-frequency measurements. RSTD is the relative timing difference between the neighbor cell j and the reference cell i, defined as TSubframeRxj–TSubframeRxi, where TSubframeRxj is the time when the UE receives the start of one subframe from cell j, and TSubframeRxi is the time when the UE receives the corresponding start of one subframe from cell i that is closest in time to the subframe received from cell j. The reference point for the observed subframe time difference shall be the antenna connector of the UE.

The following non-satellite based timing measurements are currently standardized and may be used for positioning in UTRAN (3GPP TS 25.215, v10.0.0, 5.1.8-5.1.10, 5.2.8, 5.2.10, 5.2.14):

UE measurements (3GPP TS 25.215, v10.0.0, 5.1.8-5.1.10)
   SFN-CFN observed time difference
   SFN-SFN observed time difference
   UE Rx-Tx time difference
UTRAN measurements (3GPP TS 25.215, v10.0.0, 5.2.8, 5.2.10, 5.2.14)
   Round trip time
   PRACH Propagation delay
   SFN-SFN observed time difference Mobility Scenarios Fundamentally, there are two kinds of UE mobility states:
Low activity state mobility such as cell reselection;
Connected state mobility such as handover, cell change order, Radio Resource Control (RRC) re-direction upon connection release.

In LTE there is only one low activity mobility state called idle state. In HSPA there are the following low activity states:
Idle state
URA_PCH state (UTRAN Registration Area Paging Channel state)
CELL_PCH state (Cell Paging Channel state)
CELL_FACH state (Cell Forward Access Channel state)

In HSPA systems, the connected state is also called CELL_DCH state since at least one Dedicated Channel (DCH) is in operation, at least for the maintenance of the radio link quality.

In any low activity state, the UE autonomously performs cell reselection without any direct intervention of the network. However, to some extent the UE behavior in low activity mobility state scenario could still be controlled by a number of broadcasted system parameters and performance specifications. The handover on the other hand is fully controlled by the network through explicit UE specific commands and by performance specification. Similarly, a RRC re-direction upon connection release mechanism is used by the network to re-direct the UE to change to another cell which may belong to the Radio Access Technology (RAT) of the serving cell or to another RAT. In this case, the UE typically goes into idle state upon receiving the 'RRC re-direction upon connection release' command, searches for the indicated cell or RAT, and accesses the new cell or RAT.

In both low activity state and connected state, the mobility decisions are mainly based on the same types of downlink neighbor cell measurements that were discussed above.

Both UTRAN and E-UTRAN are frequency reuse-1 systems. This means that the geographically closest cells or adjacent neighbor cells operate on the same carrier frequency. An operator may also deploy multiple frequency layers or carriers within the same coverage area. Therefore, idle mode and connected mode mobility in both UTRAN and E-UTRAN could be broadly classified into three main categories:

Intra-frequency mobility for low activity and connected states
Inter-frequency mobility for low activity and connected states
Inter-RAT mobility for low activity and connected states In intra-frequency mobility, the UE moves between cells belonging to the same carrier frequency. This is the most important mobility scenario since it involves low cost in terms of delay, as mobility measurements can be carried out in parallel with channel reception. In addition, an operator would have at least one carrier at its disposal that the operator would like to be efficiently utilized.

In inter-frequency mobility, the UE moves between cells belonging to different carrier frequencies but of the same RAT. This could be considered as the second most important scenario.

In inter-RAT mobility, the UE moves between cells that belong to different RATs such as between UMTS and GSM or vice versa, or between UMTS and LTE or vice versa.

Positioning Methods

The following positioning methods are available or are likely to be introduced in the HSPA and LTE standard for both the control plane and the user plane solution:

Fingerprinting or pattern matching;
Cell Identification (CID);
UE-assisted and network-based Enhanced CID (E-CID), including network-based angle of arrival (AoA);
UE-based and UE-assisted Assisted Global Navigation Satellite System (A-GNSS) including (Assisted Global Positioning System (A-GPS);
UE-assisted OTDOA.

Some of them are described below in more detail.

Fingerprinting or Pattern Matching:

The fingerprinting or pattern-matching-based positioning method is characterized by two main phases. During the first phase, which is the offline phase, the location fingerprints are created by performing a site-survey. The site or the coverage area is sub-divided into a rectangular grid of points. During the offline phase, one or more types of measurements such as received signal strength, signal quality, path loss, time difference of arrival, etc., from the serving and multiple neighboring cells are performed. That is, the UE measurements mentioned in the preceding sections can be used. Statistics of the obtained measurement are used to create a database or 2-dimensional table containing predetermined measurement values, which values are mapped to the points of the grid. Thus, the vector of the measurement values at a point on the grid is called the location fingerprint of that point. Measurements during the offline phase can either be obtained by using a mobile terminal or by a suitable dedicated device, which is capable of detecting cells and performing the required measurements from the detected cells. Thus, the objective of the offline training phase is to build the mobile user's location profile. During the second phase, or the so-called online phase, the mobile terminal whose position is to be determined performs measurements, such as received signal strength, from the serving and several neighbor cells. The positioning node then computes the user's location, i.e., the location of the mobile terminal, by determining the best match between the mobile reported measurements and those corresponding to the location fingerprints in the pre-defined database. The best matching location fingerprint is then reported to the mobile terminal as the estimated position.

E-CID Positioning:

E-CID positioning exploits the advantage of low-complexity and fast positioning with Cell Identification (CID), which exploits the network knowledge of geographical areas associated with cell identities, but enhances positioning further with more measurement types. With E-CID, the following sources of position information are involved: the CID and the corresponding geographical description of the serving cell, the Timing Advance (TA) of the serving cell, and the CIDs and the corresponding signal measurements of the cells (up to 32 cells in LTE, including the serving cell), as well as angle-of-arrival (AoA) measurements.

The following UE measurements can be utilized for E-CID in LTE: RSRP, RSRQ, and UE Rx-Tx time difference. The E-UTRAN measurements available for E-CID are eNodeB Rx-Tx time difference also called TA Type 2, TA Type 1 being (eNodeB Rx-Tx time difference)+(UE Rx-Tx time difference), and uplink (UL) AoA. UE Rx-Tx measurements are typically used for the serving cell, while e.g. RSRP and RSRQ as well AoA can be utilized for any cell and can also be conducted on a frequency different from that of the serving cell.

UE E-CID measurements are reported by the UE to a positioning server such as the Evolved SMLC (E-SMLC) or the Secure User Plane Location (SUPL) Location Platform (SLP) in LTE, over the LTE Positioning Protocol (LPP). The E-UTRAN E-CID measurements are reported by the eNodeB to the positioning node over the LPP Annex protocol (LPPa).

The UE may receive assistance data from the network. However, no LPP assistance for E-CID is currently specified in the standard.

OTDOA Positioning:

The OTDOA positioning method makes use of the measured timing of downlink signals received from multiple eNodeBs at the UE. The UE measures the timing of the received signals using assistance data received from the positioning node, and the resulting measurements are used to locate the UE in relation to the neighboring eNodeBs.

With OTDOA, a UE measures the timing differences for downlink reference signals received from multiple distinct locations. For each neighbor cell, the UE measures RSTD, which is the relative timing difference between neighbor cell and reference cell. The UE position estimate is then found as the intersection of hyperbolas corresponding to the measured RSTDs. At least three measurements from geographically dispersed base stations with a good geometry are needed to solve for two coordinates of the terminal and the receiver clock bias. In order to solve for position, precise knowledge of the transmitter locations and transmit timing offset is needed.

To enable positioning in LTE and to facilitate positioning measurements of a proper quality and for a sufficient number of distinct locations, new physical signals dedicated for positioning, so called Positioning Reference Signals (PRS) have been introduced and low-interference positioning subframes have been specified in 3GPP.

PRS are transmitted from one antenna port (R6) according to a pre-defined pattern. A frequency shift that is a function of Physical Cell Identity (PCI) can be applied to the specified PRS patterns to generate orthogonal patterns that model the effective frequency reuse of six, making it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g., Cell-specific Reference Signals (CRS) could in principle also be used for positioning measurements.

PRS are transmitted in pre-defined positioning subframes grouped by several consecutive subframes, i.e., one positioning occasion. Positioning occasions occur periodically with a certain periodicity of N subframes, i.e., the time interval between two positioning occasions. The standardized periods N are 160, 320, 640, and 1280 ms, and the number of consecutive subframes may be 1, 2, 4, or 6.

Carrier Aggregation

To enhance peak-rates within a technology, multi-carrier or Carrier Aggregation (CA) solutions are known. For example, it is possible to use multiple 5 MHz carriers in HSPA to enhance the peak-rate within the HSPA network. Similarly, in LTE, multiple 20 MHz carriers may for example be aggregated in the UL and/or the downlink (DL). Each carrier in a multi-carrier or CA system is generally termed as a component carrier (CC), or sometimes also as a cell. In simple words, the CC means an individual carrier in a multi-carrier system. CA is sometimes called multi-cell operation, multi-carrier operation, or multi-carrier transmission and/or reception. This means that CA can be used for transmission of signals and data in UL and DL. In a CA deployment, one of the CCs is the primary CC/cell or anchor CC/cell, while the remaining ones are called secondary or supplementary CCs/cells. Generally, the primary or anchor CC/cell carries the essential UE-specific signaling. The primary CC/cell exists in both UL and DL. The network may assign different primary CCs/cells to different UEs operating in the same sector or cell.

The CCs/cells belonging to the CA system may belong to the same frequency band, so called intra-band CA, or to different frequency bands, so called inter-band CA, or any combination thereof such as two CCs/cells in band A and one CC/cell in band B. The inter-band CA comprising of CCs/cells distributed over two bands is also called dual-band-dual-carrier-HSDPA (DB-DC-HSDPA) in HSPA, or inter-band CA in LTE. Furthermore, the CCs/cells in intra-band CA may be adjacent or non-adjacent in the frequency domain, which is also known as intra-band non-adjacent CA. A hybrid CA comprising of intra-band adjacent, intra-band non-adjacent and inter-band is also possible. Using carrier aggregation between carriers of different technologies is also referred to as multi-RAT CA, or multi-RAT-multi-carrier system, or simply inter-RAT CA. For example, the carriers from UMTS and LTE may be aggregated. Another example is the aggregation of LTE and CDMA2000 carriers. For the sake of clarity, CA within a same technology as described above may be called intra-RAT or simply single RAT CA.

Problem Description

It is not mandatory for 3GPP Release 8 multi-mode UEs to support UTRA to E-UTRA measurements in CELL_DCH state. There is a feature group indicator that can indicate whether or not such a measurement is supported by the UE. Hence, the network may not have E-UTRAN measurements carried out by the UE as a basis for a decision on when to handover or redirect the UE to a E-UTRAN cell. Such a decision then becomes blind, and may result in the UE being forced to revert to UTRAN or GSM in the event that the E-UTRAN cell coverage is bad in the area where the UE is when it receives the handover or connection release with redirection command.

Furthermore, there is no support for UTRA to E-UTRA measurements for UEs in Cell_FACH state in 3GPP Releases 8 to 10. Hence, a UE in the CELL_FACH state camping on a UTRAN cell cannot reselect an E-UTRAN cell. At the same time, it has been observed that a UE may stay longer in the CELL_FACH state than what was initially assumed in the standardization. Therefore, the UE may get stuck in UTRA even though it may be in good coverage of a higher prioritized E-UTRAN carrier.

Circuit Switched Fallback (CSFB) is introduced in 3GPP Release 8 to allow an UE in LTE to reuse circuit switched domain services by defining how the UE can switch its radio from an E-UTRAN access to another RAT access such as GSM or UTRAN access that can support circuit switched domain services. In CSFB scenarios, the UE is connected to or camping on an E-UTRAN cell, and is redirected, e.g., to an UTRAN cell when the UE receives an incoming call. This UTRAN cell might not have been measured before by the UE, and in order to minimize the interruption time, the eNB may tunnel system information for the target cell in UTRAN. However, the UE still needs to detect the cell. In case of several neighbor UTRAN cells it may take the UE some time to find the target cell if it is not the strongest cell on that carrier as perceived by the UE.

SUMMARY

It is therefore an object to address some of the problems outlined above, and to provide a solution for improving cell change procedures between frequency layers or carriers. This object and others are achieved by the methods, the radio network node and the UE according to the independent claims, and by the embodiments according to the dependent claims.

In accordance with a first embodiment, a method in a radio network node of a wireless communication network deploying at least two frequency layers is provided. The radio network node serves a user equipment in a cell of a first of the at least two frequency layers. The user equipment is configured to perform measurements on cells of the first frequency layer, and to exclude measurements on cells of a second of the at least two frequency layers. The method for supporting cell change between frequency layers comprises receiving measurement results from the user equipment, for measurements performed on at least one cell of the first frequency layer. The method further comprises determining a location of the user equipment based on the received measurement results. The method also comprises assessing a coverage of a target cell of the second frequency layer based on the determined location and a coverage map for the at least two frequency layers. Further, the method comprises determining whether to change to the target cell based on the assessment of the target cell coverage.

In accordance with a second embodiment, a radio network node for a wireless communication network deploying at least two frequency layers is provided. The radio network node is configured to serve a user equipment in a cell of a first of the at least two frequency layers, and to support cell change between frequency layers. The user equipment is configured to perform measurements on cells of the first frequency layer, and to exclude measurements on cells of a second of the at least two frequency layers. The radio network node comprises a receiver configured to receive measurement results from the user equipment, for measurements performed on at least one cell of the first frequency layer. The radio network node further comprises a processing circuit configured to determine a location of the user equipment based on the received measurement results, and to assess a coverage of a target cell of the second frequency layer based on the determined location and a coverage map for the at least two frequency layers. The processing circuit is further configured to determine whether to change to the target cell based on the assessment of the target cell coverage.

In accordance with a third embodiment, a method in a user equipment of a wireless communication network deploying at least two frequency layers is provided. The user equipment is served in a cell of a first of the at least two frequency layers by a radio network node and is configured to perform measurements on cells of the first frequency layer and to exclude measurements on cells of a second of the at least two frequency layers. The method for supporting cell change between frequency layers comprises performing measurements on at least one cell of the first frequency layer, and determining a location of the user equipment based on results from the performed measurements. The method further comprises assessing a coverage of a target cell of the second frequency layer based on the determined location and a coverage map for the at least two frequency layers. The method also comprises transmitting information related to the assessed coverage of the target cell to the radio network node.

Furthermore, in accordance with the third embodiment, a method in a radio network node of a wireless communication network deploying at least two frequency layers is provided. The radio network node serves a user equipment in a cell of a first of the at least two frequency layers. The user equipment is configured to perform measurements on cells of the first frequency layer, and to exclude measurements on cells of a second of the at least two frequency layers. The method for supporting cell change between frequency layers comprises receiving information from the user equipment related to a coverage of a target cell of the second frequency layer, and determining whether to change to the target cell based on the received information.

In accordance with a fourth embodiment, a user equipment for a wireless communication network deploying at least two frequency layers configured to support cell change between frequency layers is provided. The user equipment is configured to be served in a cell of a first of the at least two frequency layers by a radio network node and to perform measurements on cells of the first frequency layer and to exclude measurements on cells of a second of the at least two frequency layers. The user equipment comprises a processing circuit configured to perform measurements on at least one cell of the first frequency layer, to determine a location of the user equipment based on results from the performed measurements, and to assess a coverage of a target cell of the second frequency layer based on the determined location and a coverage map for the at least two frequency layers. The user equipment further comprises a transmitter configured to transmit information related to the assessed coverage of the target cell to the radio network node.

Furthermore, in accordance with the fourth embodiment, a radio network node for a wireless communication network deploying at least two frequency layers is provided. The radio network node is configured to serve a user equipment in a cell of a first of the at least two frequency layers and to support cell change between frequency layers. The user equipment is configured to perform measurements on cells of the first frequency layer, and to exclude measurements on cells of a second of the at least two frequency layers. The radio network node comprises a receiver configured to receive information from the user equipment related to a coverage of a target cell of the second frequency layer. The radio network node also comprises a processing circuit configured to determining whether to change to the target cell based on the received information.

In accordance with a fifth embodiment, a method in a user equipment of a wireless communication network deploying at least two frequency layers is provided. The user equipment is camping on a cell of a first of the at least two frequency layers in idle mode and is configured to perform measurements on cells of the first frequency layer and to exclude measurements on cells of a second of the at least two frequency layers. The method for supporting cell change between frequency layers comprises performing measurements on at least one cell of the first frequency layer, and determining a location of the user equipment based on results from the performed measurements. The method also comprises assessing a coverage of a target cell of the second frequency layer based on the determined location and a coverage map for the at least two frequency layers, and determining whether to change to the target cell based on the assessment of the target cell coverage.

In accordance with a sixth embodiment, a user equipment for a wireless communication network deploying at least two frequency layers is provided. The user equipment is configured to support cell change between frequency layers, to camp on a cell of a first of the at least two frequency layers in idle mode, and to perform measurements on cells of the first frequency layer and exclude measurements on cells of a second of the at least two frequency layers. The user equipment comprises a memory and a processing circuit configured to perform measurements on at least one cell of the first frequency layer, and to determine a location of the user equipment based on results from the performed measurements. The processing circuit is further configured to assess a coverage of a target cell of the second frequency layer based on the determined location and a coverage map for the at least two frequency layers, and to determine whether to change to the target cell based on the assessment of the target cell coverage.

An advantage of embodiments is that they provide improved cell change procedures for mobility, such as a better alternative to a blind handover and a connection release with blind redirection when the target cell is not co-located with the source cell.

Another advantage of embodiments is that mobility is enhanced for Release 8-10 UEs in CELL_FACH state, as they avoid getting stuck in UTRAN cells due to missing support of UTRA to E-UTRA measurements.

Other objects, advantages and features of embodiments will be explained in the following detailed description when considered in conjunction with the accompanying drawings and claims.

DETAILED DESCRIPTION

Figure 1A:
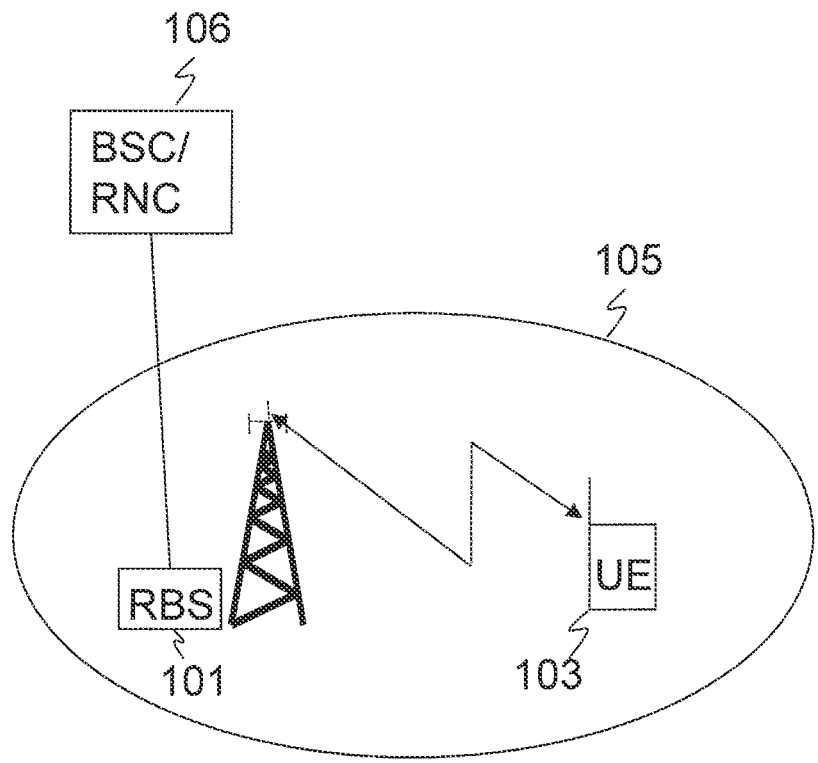
FIGS. 1a and 1b are schematic illustrations of radio access networks.
Figure 1B:
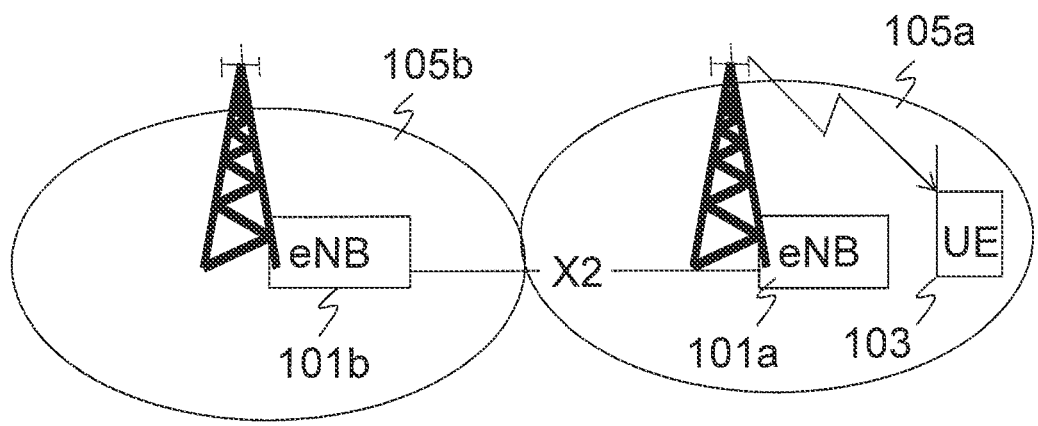

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an Application Specific Integrated Circuit (ASIC). It will also be appreciated that while the embodiments are primarily described in the form of a method and a node, they may also be embodied in a computer program product as well as in a system comprising a computer processor and a memory coupled to the processor, wherein the memory is encoded with one or more programs that may perform the functions disclosed herein.

The techniques described herein improve a blind cell change, such as a blind handover and connection release with blind redirection, when the target cell is not co-located with the source cell. Embodiments of the invention are described in a non-limiting general context in relation to the following example scenarios:

1. Blind handover, redirect, or cell change order in a network controlled mobility scenario;
2. Blind handover, redirect, or cell change order in a UE controlled mobility scenario;
3. Blind configuration of a secondary CC in a CA or multi-carrier scenario;
4. A CSFB scenario.

Although the above listed scenarios are examples when embodiments of the invention are advantageous, there may be other cell change scenarios for both idle mode and connected mode UEs in which embodiments of the invention may be applied.

In the following, embodiments of the invention will be described with more details, addressing mobility problems between 3G and 4G networks when the source and target cells are not co-located. In exemplary embodiments, the network determines, for example using UE measurements of 2G and 3G cells, whether the UE is within coverage of a 4G target cell. This allows a UE to be handed over or redirected to E-UTRAN without explicit E-UTRA measurements. More generally, a network node or a UE or a combination of both the network node and the UE determines, again based on UE measurements of one set of cells for one or more carriers and one or more RATs, whether the UE is within coverage of another set of unmeasured target cells.

The network node may in one embodiment communicate with another network node, such as a positioning node storing and maintaining a coverage map, to acquire the information related to the stored coverage map via signaling means. In a variant of this embodiment, the determination of the target cell coverage may be performed fully or partially by the UE, in which case the coverage map may be maintained in the UE.

The different embodiments of the invention will hereinafter be described with reference to the different example scenarios listed above. However, first some common parts of the embodiments are described.

Common Parts

Figure 2:
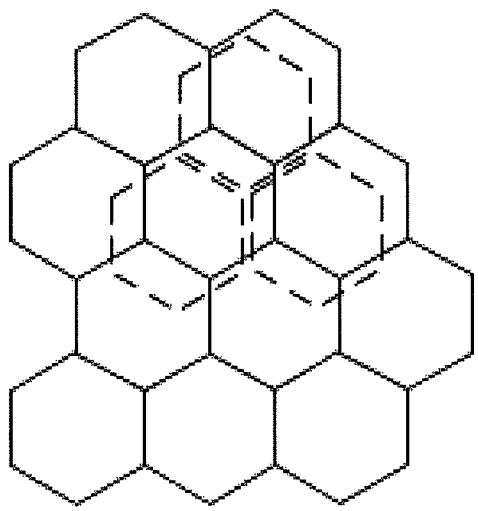
FIG. 2 is a schematic illustration of non co-located cells on two frequency layers F1 and F2.
Figure 2:
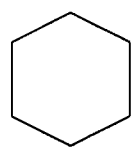
Figure 2:
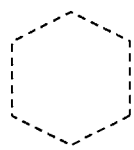
Figure 3:
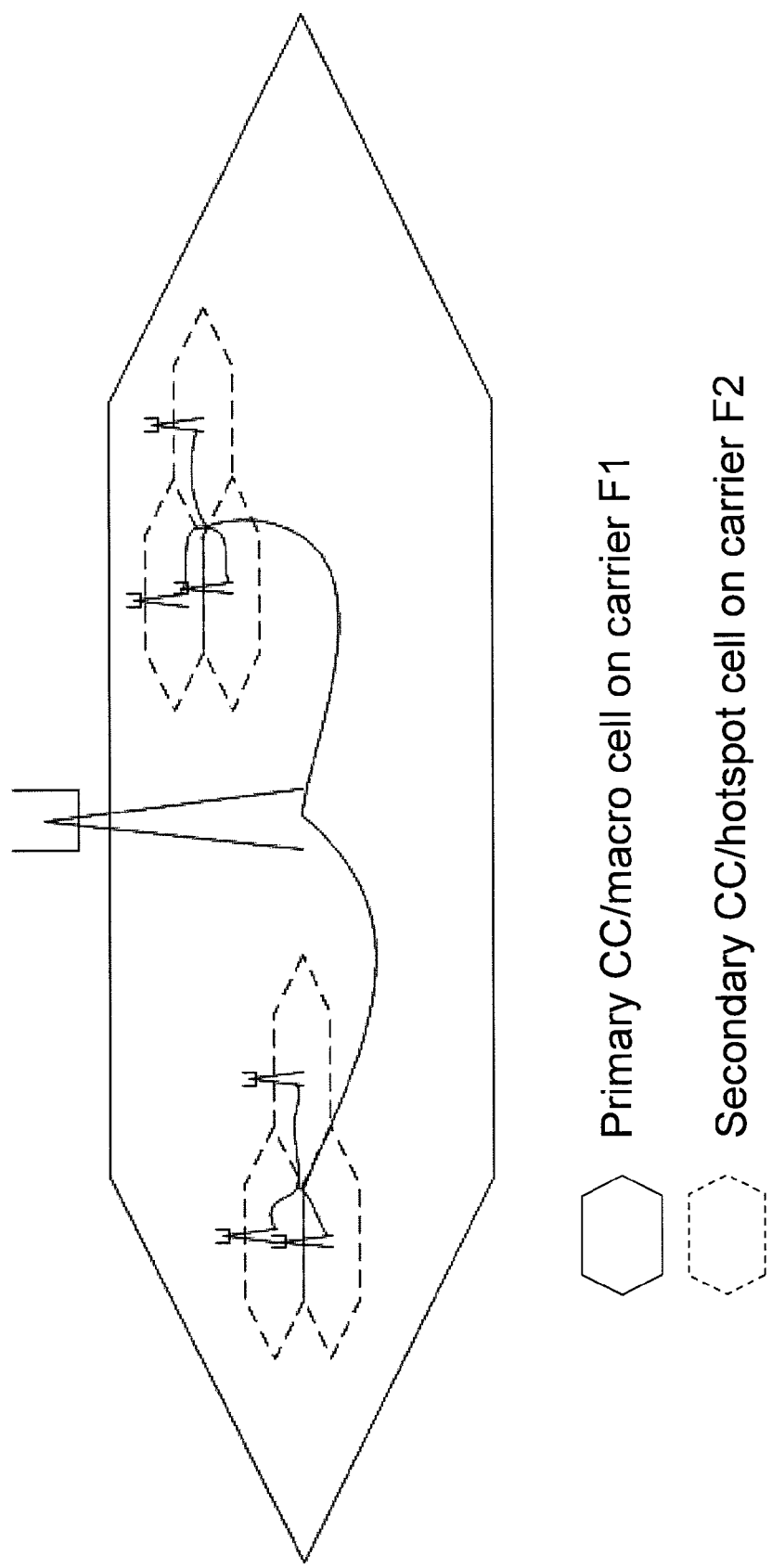
FIG. 3 is a schematic illustration of a CA scenario.

One aspect of the fundamental problem addressed is illustrated in FIG. 2. Cells on different frequency layers or carriers, in FIG. 2 illustrated by cells on 3G on carrier F1 and on 4G on carrier F2, are not necessarily co-located. Hence, being at a particular distance from a base station in one layer does not mean that the UE is at the same distance from a base station on another layer. One may also imagine that cell sizes may differ on different layers. Further, a layer with small cells may have both cells that are co-located with larger cells on another carrier, but also additional cells in-between those sites in order to achieve full coverage. In some environments, one layer may only be hosting hotspot coverage areas, whereas another layer is providing full coverage providing mobility. The hotspot cells may be on a secondary CC (carrier F2) in the case of CA as illustrated in FIG. 3, where a primary CC (carrier F1) offers mobility and secondary CCs are available only at hotspots. However, hotspot cells may also be used purely for traffic load balancing. Thus embodiments of the invention are not only applicable to strictly non-co-located deployment scenarios.

There are several existing methods for estimating a UE's location. Several of these methods were described above in the background section. The positioning method used in a given instance may depend on several factors, such as the UE's capabilities and the UE state. The network may also implement other methods than those mentioned above. Some examples are:

- Location estimated from a timing offset used by each base station for dedicated transmissions using macro diversity. One example is UMTS soft handover in CELL_DCH state, where a Dedicated Physical Channel (DPCH) shall be received within ±1/10th of a slot.
- Location predicted based on a UE trail, such as recent handovers and time between those handovers, and knowledge of geography and/or topography. One example is when the UE is detected to be travelling along a particular route.

It will be appreciated that any of the positioning methods described here or any other standardized or proprietary solution revealing the UE location with good enough accuracy may be used for the techniques described here for determining whether there is coverage from an unmeasured cell.

Figure 4:
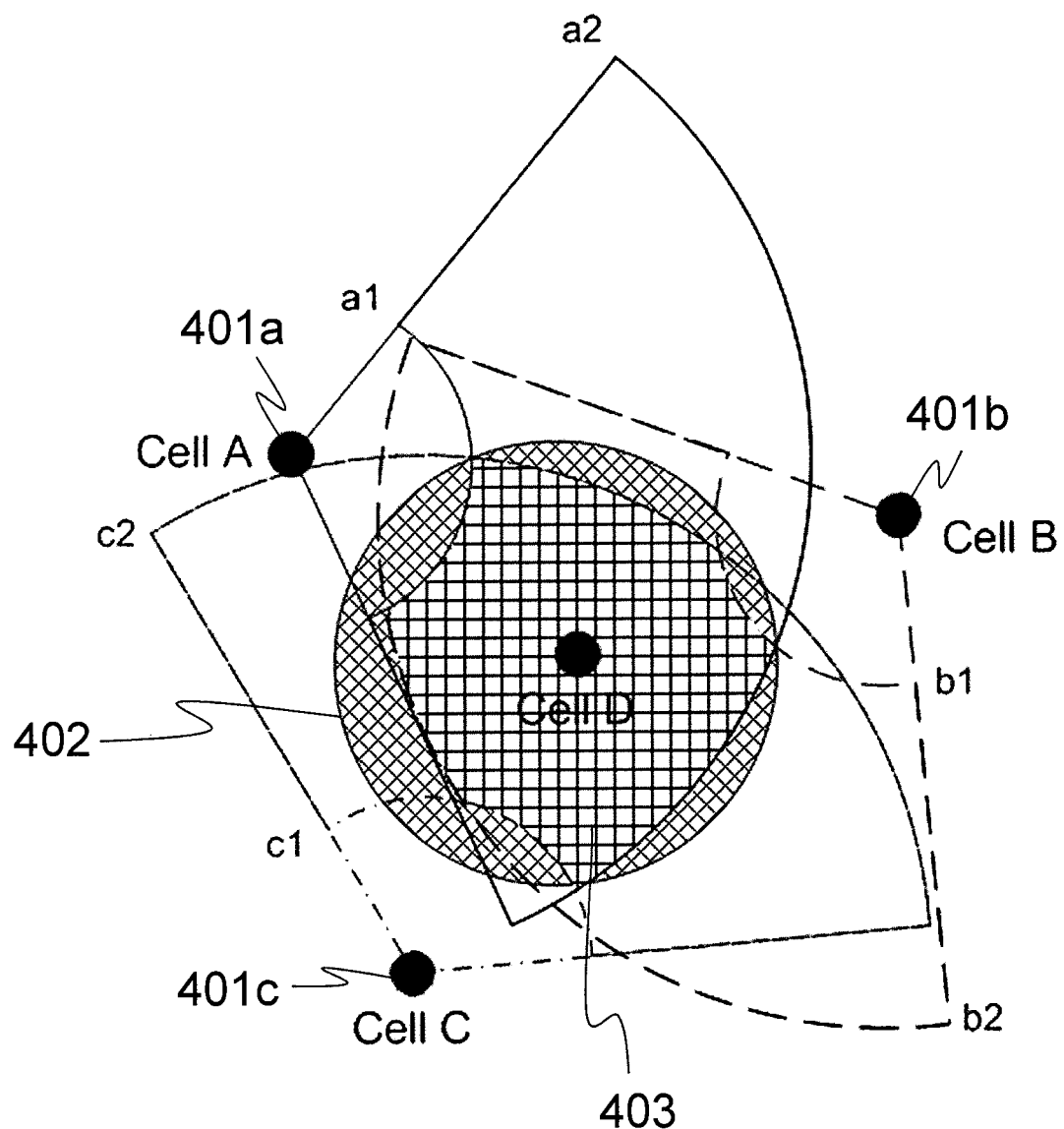
FIG. 4 is a schematic illustration of how coverage of an unmeasured cell D can be expressed in distance from the measured cells A, B, and C.

A simplistic approach to determine from measurements on one carrier whether there is cell coverage on another carrier is illustrated in FIG. 4. Here, it is determined, from an estimated distance from an RBS $401a$-$c$ of each cell A, B and C on one carrier, whether the UE is within coverage of the cell D on another carrier. The estimated distances to the RBSs may be derived from timing offsets of signals received for the different cells A, B, and C, or from signal strength levels (e.g., RSRP, RSCP) and/or signal quality levels (e.g., RSRQ, Ec/No). In FIG. 4 it is illustrated how the coverage of an unmeasured cell D, which is normally given by the circle 402, may be expressed in distances from the RBSs $401a$-$c$ derived from the measured cells A, B, and C. If the UE is at a distance from the RBS $401a$ serving cell A which is greater than a1 and smaller than a2, and at a distance from the RBS $401b$ serving cell B which is greater than b1 and smaller than b2, and at a distance from the RBS $401c$ serving cell C which is greater than c1 and smaller than c2, the UE is within the area 403 which is thus within the coverage area 402 of cell D.

In a more sophisticated approach, some entity in the network maintains a coverage map for intra-RAT and inter-RAT carriers with overlapping coverage. In the case of UTRA this entity may be the RNC, and in the case of E-UTRA, it may be the eNodeB. The particular deployment of the coverage map is not particularly important, as long as it accessible to the entity that seeks to determine whether there is coverage from an unmeasured cell. The entity may be a network node or the UE itself as will be described below. When e.g. the network receives updated information on the UE location, the coverage map(s) is checked to see whether there are cells with good coverage on other carriers potentially belonging to other RATs in that location. The coverage map may e.g. provide a mapping between signal strength values for the different frequency layers or carriers in a specified location. One example is a mapping between the CPICH RSCP value for a UTRA cell in a certain location and the corresponding RSRP value for a E-UTRA cell. The mapping of other parameter values such as quality measure values may also be provided by the coverage map. Examples of signal quality measures are CPICH Ec/No for a UTRA cell and RSRQ for a E-UTRA cell. Based on a combination of factors, such as a predicted quality of the coverage obtained from the coverage map and the UE location, and a priority of the other carriers relative to the priority of the current intra-frequency carrier, the network may take a decision to move the UE from a cell on one carrier to a cell on another carrier.

Maintenance of the coverage map(s) may be carried out in several ways, both offline and online. The following is a non-limiting list of examples of how to maintain the coverage map(s). Any of the following techniques may be used in combination with any other one:

- The network operator may conduct simultaneous measurements on the concerned carriers in drive tests;
- The network operator may every now and then configure UEs with full measurement capabilities to conduct measurements on all concerned carriers, or at least on intra-frequency carrier and higher prioritized carrier(s). The results may then be used to update the coverage maps;
- The network operator may assess statistics on the number of reverts after handover/redirection to see whether the coverage map(s) should be revised for some locations;
- The network operator may use information from MDT-capable devices;
- The network operator may use radio propagation simulations and/or calculations as a basis for maintaining the coverage map(s).

Hereinafter, the different embodiments of the invention will be described with reference to the four example scenarios listed above.

Figure 5A:
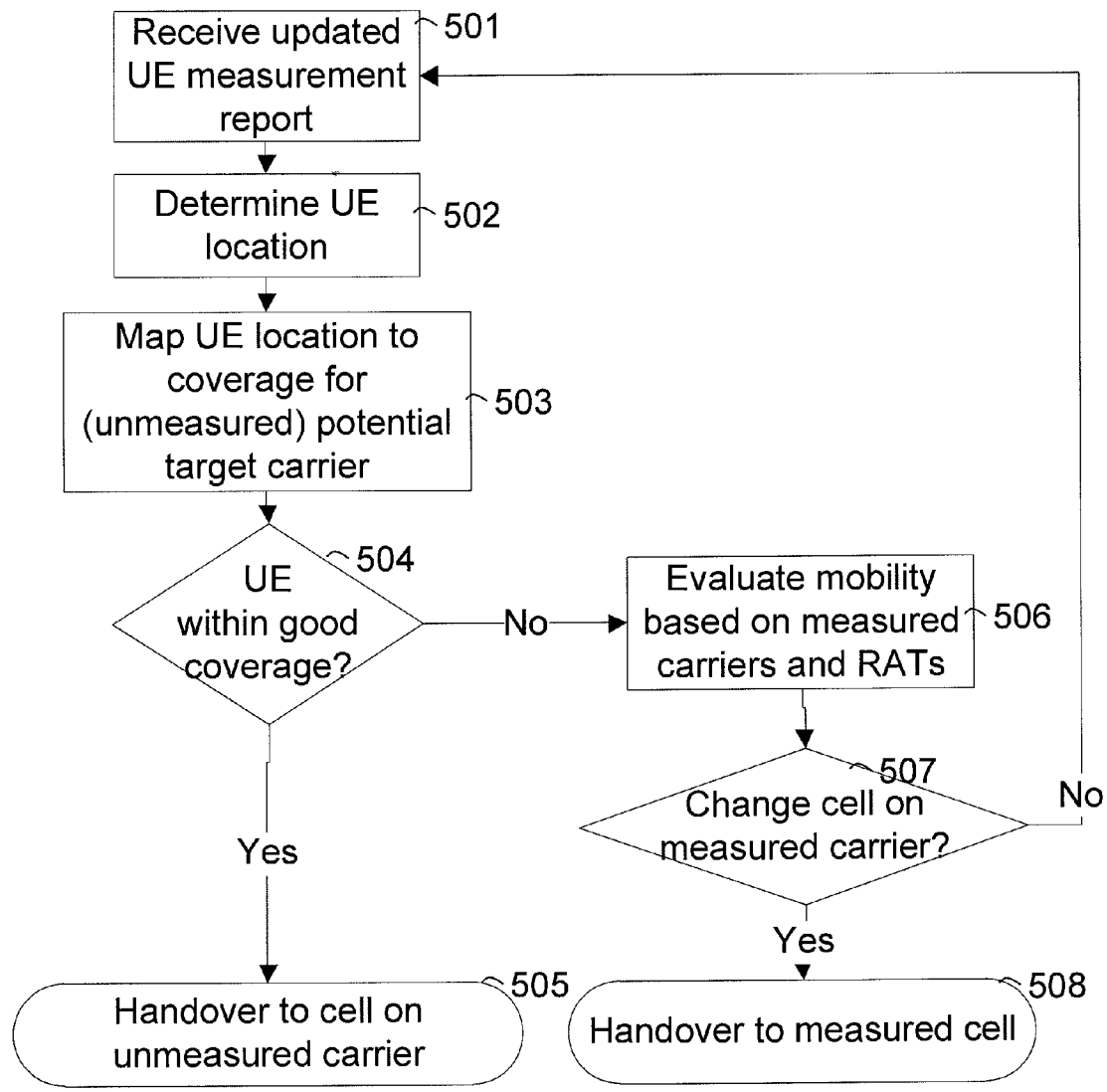
FIGS. 5a-d are flowcharts illustrating methods according to embodiments.

Scenario 1: Blind Handover, Redirect, or Cell Change Order in a Network-Controlled Mobility Scenario This scenario is described with reference to FIG. 5a. The UE is within an area where there is coverage on several carriers. The network has configured the UE to carry out measurements on cells of one or more frequency layers or carriers, but is excluding measurements on cells of at least one frequency layer or carrier. There may be several reasons to why cells of a carrier are excluded from measurements. One reason may be that the measurement capabilities of the UE are restricted. As mentioned above, it is e.g. not mandatory for 3GPP Release 8 multi-mode UEs to support UTRA to E-UTRA measurements. In such a case, the UE may thus support both 3G and 4G but does not support UTRA to E-UTRA measurements in CELL_DCH state, and a mobility decision from 4G to 3G must thus be blind.

In step 501, the UE reports measurement results to the network. This is done periodically to keep the measurement result reports up to date. Based on the measurement results, the network may determine the location of the UE, in step 502. Any of the positioning methods described herein may e.g. be used to determine the UE location. In step 503 the network assesses the coverage of a potential target cell on the unmeasured frequency layer/carrier which may be a more highly prioritized frequency layer/carrier, using the determined UE location and the coverage map. As an example, an RSRQ value for an E-UTRAN cell in the UE location is derived from the coverage map. If the derived RSRQ value is above a threshold and the UE thus is expected to receive the unmeasured cell with good quality (see 504/Yes), the network issues a cell change command to the UE in step 505. The cell change command may be a command for handover, release with redirection, or cell change order.

However, if the UE is not expected to receive the unmeasured cell with good quality, e.g if the RSRQ value is below the threshold (see 504/No), a normal mobility evaluation based on the measured carriers is executed in steps 506 and 507. If it is determined that a cell change should be performed in the normal mobility evaluation (507/Yes), the result is a handover, a release with redirection, or a cell change order to a measured cell in step 508. In the event that the mobility evaluation does not result in a handover, a release with redirect, or a cell change order to a measured cell (see 507/No), the network waits for the next measurement report, or longer time than that, to again assess whether the UE is likely to be within good coverage of an unmeasured frequency layer cell. Steps 501-504 are thus repeated. The time the network waits before it performs the next assessment of whether the UE is likely to be within good coverage of the unmeasured frequency layer cell, may depend on UE history as determined from past reports and/or activities, such as if the UE has been stationary or mobile.

Depending on the location method used, it may not be necessary to order the UE to send periodic measurement reports. If the base station uses signals received on the UL to determine location of the UE, i.e. determines location based on time of arrival measurements, it is sufficient to request event-triggered reporting for supporting mobility based only on the measured carriers.

Figure 5B:
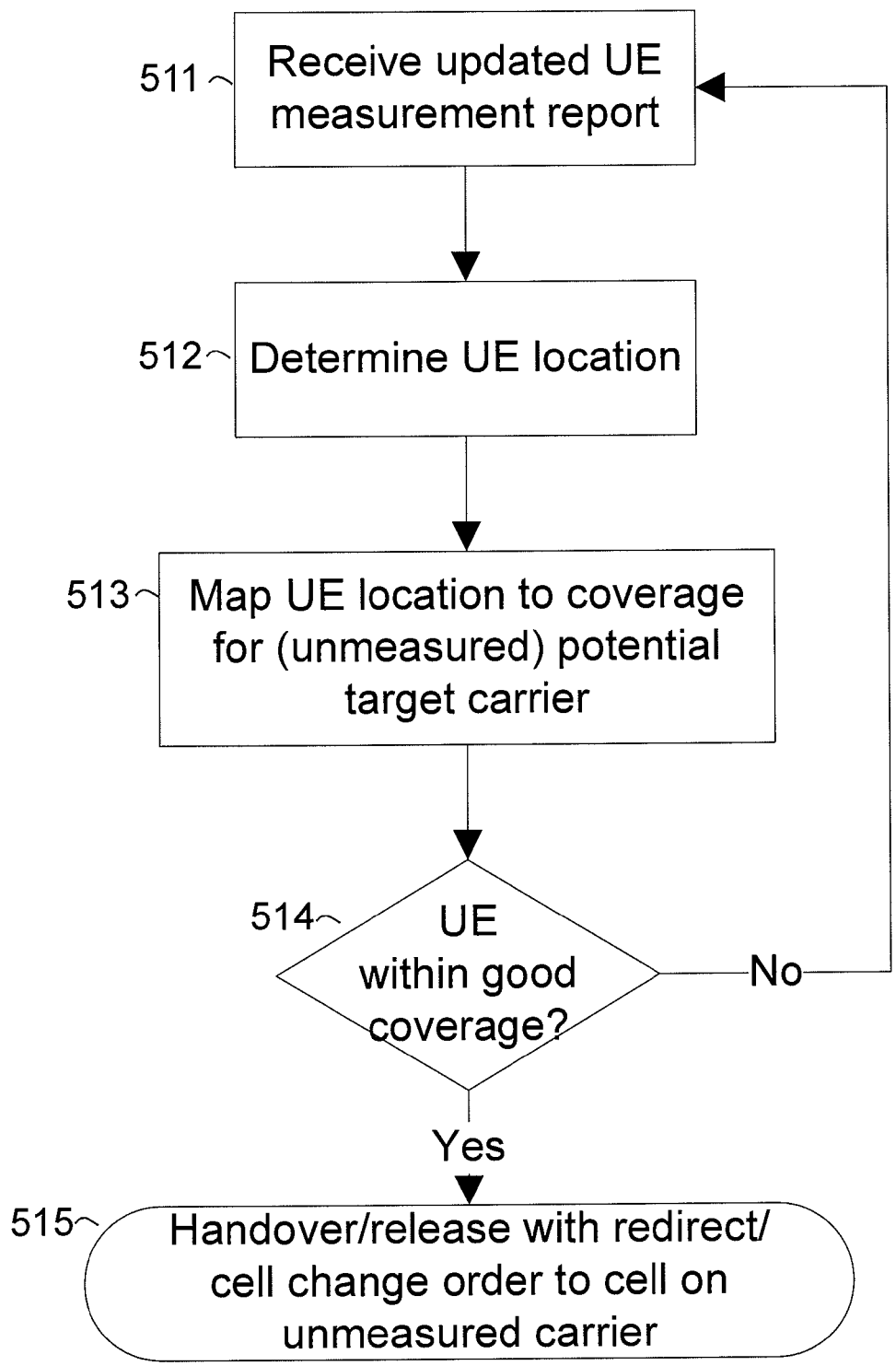

Scenario 2: Blind Handover/Redirection/Cell Change Order in a UE-Controlled Mobility Scenario This scenario is described with reference to FIG. 5*b*. Also here, the UE is within an area where there is coverage on several carriers. The network has configured the UE to carry out measurements on cells of one or more frequency layers or carriers, but is excluding measurements on cells of at least one frequency layer or carrier. There may be several reasons to why cells of a carrier are excluded from measurements. One reason may be that the measurement capabilities of the UE are restricted. As mentioned above, Release 8-10 terminals may get stuck in UTRA due to missing support of UTRA to E-UTRA measurements when the UE is in CELL_FACH state, as 3G to 4G mobility is not possible in this UE state.

In step 511, the UE reports measurement results to the network. This is done periodically to keep the measurement result reports up to date. In the case of UTRA, this could be periodic Random Access Channel (RACH) measurement reports of the monitored set of cells in CELL_FACH state. Based on the measurement results, the network may determine the location of the UE, in step 512. As an example, any of the positioning methods described herein may be used to determine the UE location. In step 513 the network assesses the coverage of a potential target cell on the unmeasured frequency layer/carrier which may be a more highly prioritized frequency layer/carrier, using the determined UE location and the coverage map. As an example, an RSRQ value for an E-UTRAN cell in the UE location is derived from the coverage map. If the derived RSRQ value is above a threshold and the UE thus is expected to receive the unmeasured cell with good quality (see 514/Yes), the network issues a handover, release with redirect, or cell change order to the UE in step 515. This may involve the network changing UE state before executing aforementioned operation.

However, if the UE is not expected to receive the unmeasured cell with good quality, e.g if the RSRQ value is below the threshold (see 504/No), the network waits for the next measurement report, or longer time than that, to again assess whether the UE is likely to be within good coverage of an unmeasured frequency layer cell. Steps 511-514 are thus repeated. The time the network waits before it performs the next assessment of whether the UE is likely to be within good coverage of the unmeasured frequency layer cell, may depend on UE history as determined from past reports and/or activities, such as if the UE has been stationary or mobile.

Depending on the location method used, it may not be necessary to order the UE to send periodic measurement reports. If the base station uses signals received on the UL to determine location of the UE, i.e. determines location based on time of arrival measurements, it is sufficient to request event-triggered reporting for supporting mobility based only on the measured carriers.

Scenario 3: Blind Configuration of Secondary CC in CA or Multi-Carrier Scenario

Figure 5C:
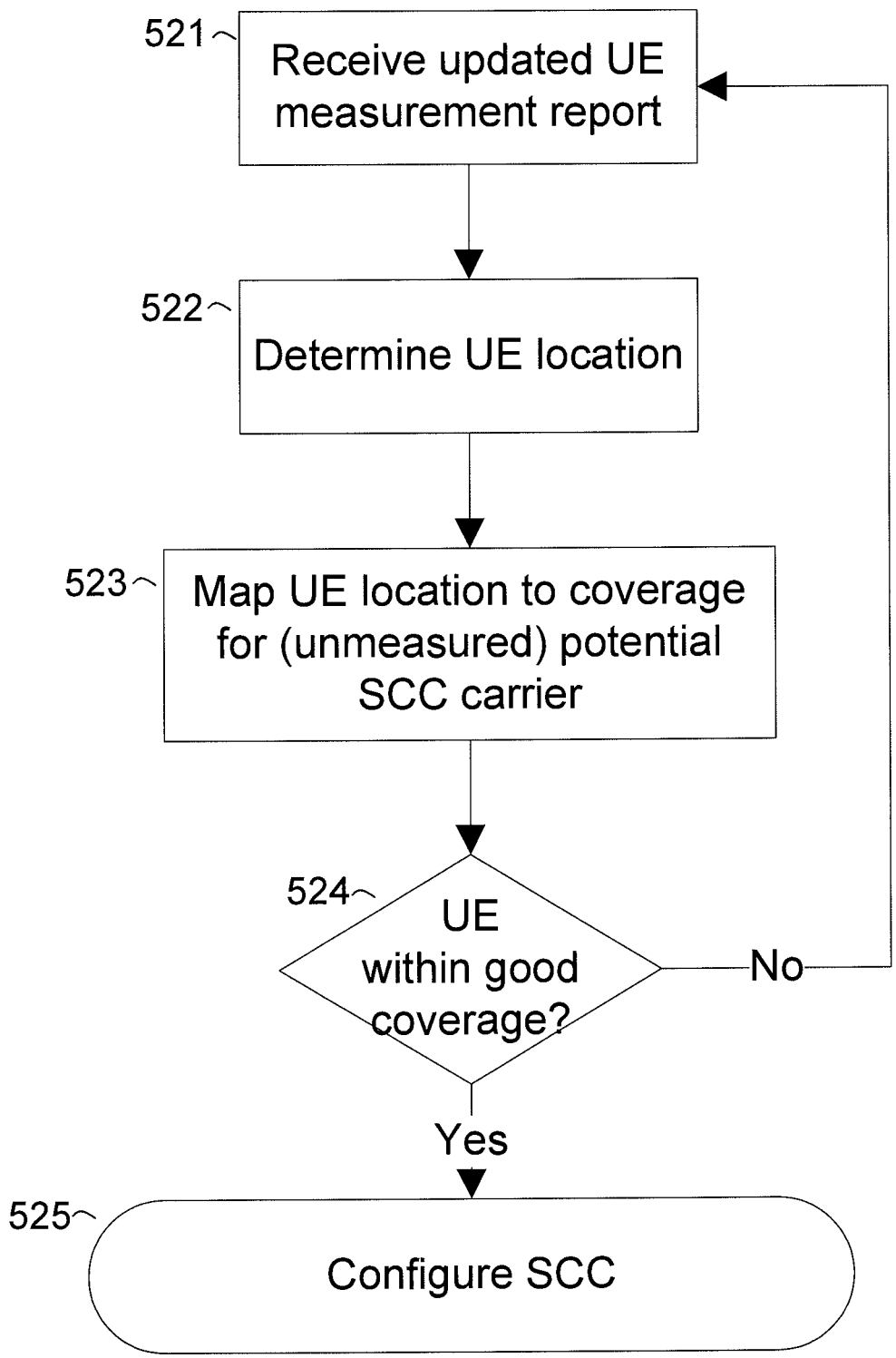

This scenario is described with reference to FIG. 5*c*. Here, the UE is within an area where CA or multi-carrier is supported. The UE is connected to a primary cell or anchor cell on a primary CC (PCC). The primary cell is a macro cell that covers a wide area and thus provides mobility. In this area there are also several secondary cells on a secondary CC (SCC). The secondary cells are smaller cells than the primary cell and the SCC does not provide coverage over the complete area. The network has configured the UE with measurements on PCC, but not on SCC which is thus "non-configured". In this scenario, embodiments of the invention may thus be used in a CA scenario to determine whether the UE is within a "hotspot" secondary cell's coverage when connected to a macro primary cell without actually having the UE to measure the secondary cell.

In step 521, the UE reports measurement results to the network. This is done periodically to keep the measurement result reports up to date. Based on the measurement results, the network may determine the location of the UE, in step 522. As an example, any of the positioning methods described herein may be used to determine the UE location. In step 523 the network assesses the coverage of a potential secondary cell on the unmeasured SCC, using the determined UE location and the coverage map. If the UE is expected to receive the unmeasured secondary cell with good quality (see 524/Yes), the network may change cell, meaning that it configures the SCC in 525, which was previously non-configured. The UE will after the SCC configuration thus have to do measurements on the SCC as a preparation to receive data on SCC in short notice.

However, if the UE is not expected to receive the unmeasured secondary cell with good quality (see 524/No), the network waits for the next measurement report, or longer time than that, to again assess whether the UE is likely to be within good coverage of an unmeasured frequency layer cell. Steps 521-524 are thus repeated. The time the network waits before it performs the next assessment of whether the UE is likely to be within good coverage of the unmeasured frequency layer cell, may depend on UE history as determined from past reports and/or activities, such as if the UE has been stationary or mobile.

Depending on the location method used, it may not be necessary to order the UE to send periodic measurement reports. If the base station uses signals received on the UL to determine location of the UE, i.e. determines location based on time of arrival measurements, it is sufficient to request event-triggered reporting for supporting mobility based only on the measured carriers.

In the case of E-UTRA, the above described embodiments may be particularly interesting for non-configured secondary cell measurements in intra-band as well as inter-band CA. This is due to that all mobility is to be based on the primary cell alone, and non-configured secondary cells are in some cases to be measured using measurement gaps, whereas configured secondary cells may be measured without gaps. The measurement gaps puncture the serving primary cell communication and thus reduce the throughput. Hence by avoiding measurements of non-configured secondary cells it may be possible to increase the throughput in the primary cell when the UE has bad coverage on the secondary cell.

Scenario 4: Improved Circuit-Switched Fallback Scenario

Figure 5D:
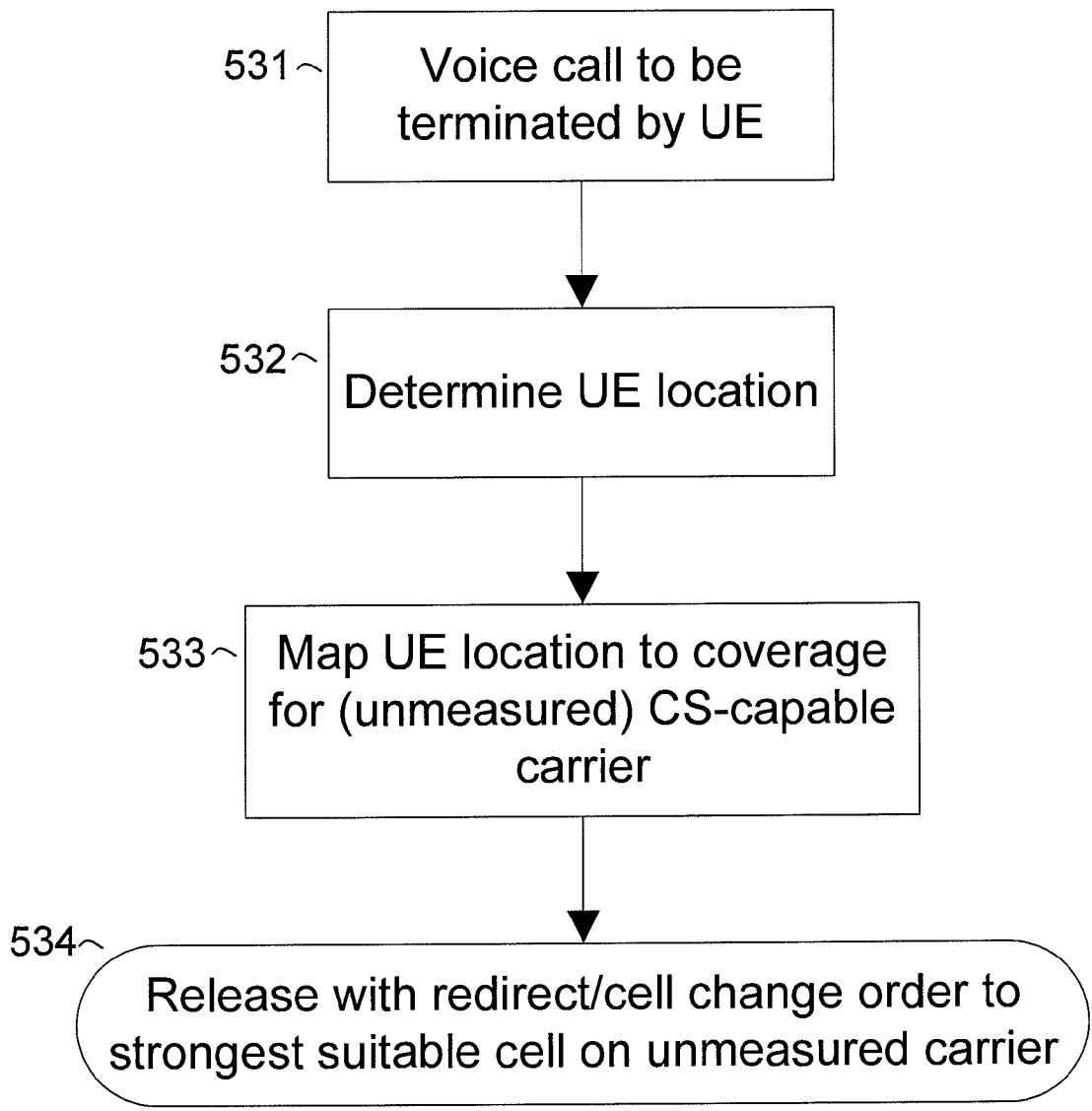

This scenario is described with reference to FIG. 5d. Here, a UE is connected to or, if in idle mode, camping on an E-UTRA cell in a network that does not contain a gateway between circuit-switched (CS) and packet-switched (PS) domains. Such a gateway is needed to allow for Voice over IP (VoIP) calls in E-UTRA. The UE has not been configured with measurements on 2G or 3G carriers and has thus not carried out any inter-RAT measurements.

In step 531, the network detects an incoming voice call that is to be terminated by the UE. In case the UE is in idle state, the network will page the UE by which it enters the connected state. The network determines the UE location in step 532.

In case the UE already was in connected state, the network may already have information on a UE position from past measurements or UL transmissions. Otherwise it determines the position based on the latest measurement. In case the UE recently was in idle mode, the network may not have full knowledge on the UE location. However, the UE can be located while engaged in random access. For example the network can perform measurements on the uplink received signal sent by the UE on the random access channel. Example of measurements which can be performed are one way propagation delay, time of arrival of signal, UE Rx-Tx time difference measurement, and Angle of Arrival (AoA) of signals. The network can use these measurements to determine the location of the UE at the time of random access.

The network determines, in step 533, the best target 3G or 2G cell with respect to the determined UE location by using the coverage map, and issues, in step 534, a handover, a release with redirection or a cell change order to that cell. Tunneling of system information may or may not be done at the same time. Since the target 2G or 3G cell is the best or the strongest cell at the UE position, the UE will find it quickly although it may not be co-located with the E-UTRA source cell. The delay is thus minimized.

This is an example of a service-triggered mobility for which a low setup delay and interruption time is needed. Another example of when low delay and short interruption time is needed is for congestion-triggered mobility.

Signaling Means Between Radio Network Node and Network Node Storing Coverage Maps As discussed above, in order to assess the coverage of a cell on an unmeasured frequency layer or carrier the network uses the UE's location and the coverage map. The coverage map may be stored and maintained in different entities or nodes. Embodiments of the invention therefore involve a signaling exchange between e.g. the serving radio network node and another node containing the coverage maps, as described hereinafter.

In existing systems, pre-defined coverage maps are generally located in a positioning node or in a dedicated server. These coverage maps may be used for positioning methods like fingerprinting. For example, in LTE the coverage maps can reside in the E-SMLC, which is the positioning node. In several of the scenarios described above, a radio network node, such as the eNodeB in LTE or the RNC in HSPA, performs the mobility decision, e.g., the handover. Thus, in some embodiments of the present invention, the radio network node acquires one or more sets of information associated with the coverage map related to the target cells of the unmeasured frequency layer or carrier F2. The acquired information requires signaling between the radio network node and the node which contains the data base or coverage map.

The signaled information may comprise for example the expected signal value for the target frequency layer F2 associated with the measured signal value on the source frequency layer F1. The signal value may be a signal strength or a signal quality value. The signaled information may alternatively comprise an offset which is a function of the measured signal value on the source frequency layer F1 and the corresponding value on the target frequency layer F2. The advantage is that the signaling of an offset reduces the signaling overhead.

In still another alternative, the signaled information may comprise an offset which is a function of the measured signal value on the source frequency layer F1, the corresponding signal value on the target frequency layer F2, and a reference value. The frequency layers F1 and F2 may belong to the same or different frequency bands. In case of different bands the difference between the frequencies can be very large, e.g. if F1 and F2 belong to band 1 (2100 MHz) and band 8 (900 MHz) respectively. The dependency of carrier frequency on the coverage or path loss is well known. Therefore path loss, which depends upon frequency, may also be very different in case of large difference between frequencies. The coverage is significantly better at lower carrier frequencies. According to the free space model the frequency dependency on path loss is given by (1):

$$\Delta L = 20\log_{10}\left(\frac{F_1}{F_2}\right) \quad (1)$$

where $\Delta L$ is the path loss difference between carrier frequencies F1 and F2 assuming the same distance between the transmitter and receiver.

Assuming F1=1800 MHz and F2=900 MHz then according to (1) the path loss difference in free space is approximately 6 dB. Assuming F1=2100 MHz and F2=900 MHz then the path loss difference in free space is even larger i.e. approximately 7 dB. For the frequencies F1 and F2 in bands 450 MHz and 3500 MHz respectively in free space the difference is approximately 18 dB. The reference value can therefore be used to compensate for such discrepancy due to the large frequency difference.

UE-Based Method for Determining Coverage of Non-Measured Frequency Layers

In the above embodiments described with reference to scenario 1-4, a radio network node receives the measurements, determines the location of the UE based on the measurements, and assesses the coverage of cells of a non-measured frequency layer, in order to decide whether to perform a cell change to the non-measured frequency layer. However, in alternative embodiments, the method is performed by the radio network node and the UE in cooperation, as will be described hereinafter.

In this exemplary alternative embodiment of the invention, the UE maintains the coverage map database. Such a database may be used for a UE-based positioning method. The database can be updated by the UE by performing measurements in the background, or it may be updated by the network. It can be used for all the mobility scenarios 1-4 described above.

The UE performs measurements on cells of one frequency layer or RAT such as the serving RAT, and determines its location from the measurements. The UE then uses the coverage map to assess the coverage of a target cell of another RAT. Based on this assessment, the UE reports a derived value of a measurement on the target cell to the radio network node. The reporting of the derived value of the target cell may be sent in response to a request from the network. The network in turn uses the received report results for performing one or more of the required mobility tasks described above.

According to one embodiment, the UE may also report to the network its capability to support such a feature, i.e., the capability to provide derived measurement results for a certain target cell on a frequency layer without performing the actual measurement on that frequency layer. The capability information may be used by the network for several purposes, such as to avoid configuring measurement gaps for certain frequency layers or RATs.

In still another alternative embodiment, relevant when the UE is in idle mode, the method is entirely performed by the UE, as it is the UE that decides about any mobility measures in terms of cell reselection when in idle mode. The UE thus performs the measurements, determines its location, assesses the coverage of a target cell of an unmeasured frequency layer based on the location and the coverage map, and eventually also determines whether to perform a cell reselection based on the assessed coverage.

The method is thus the same in all three alternative embodiments, although different nodes are involved in the different embodiments: Determine a UE location based on UE measurements of one set of cells for one or more carriers and one or more RATs, and to assess based on the determined UE location and a coverage map whether the UE is within coverage of a set of unmeasured target cells. This is done to decide whether to change to a target cell of an unmeasured frequency layer. The purpose is the same in all three embodiments, i.e. to improve cell change procedures for mobility between frequency layers.

Methods and Nodes

Figure 6A:
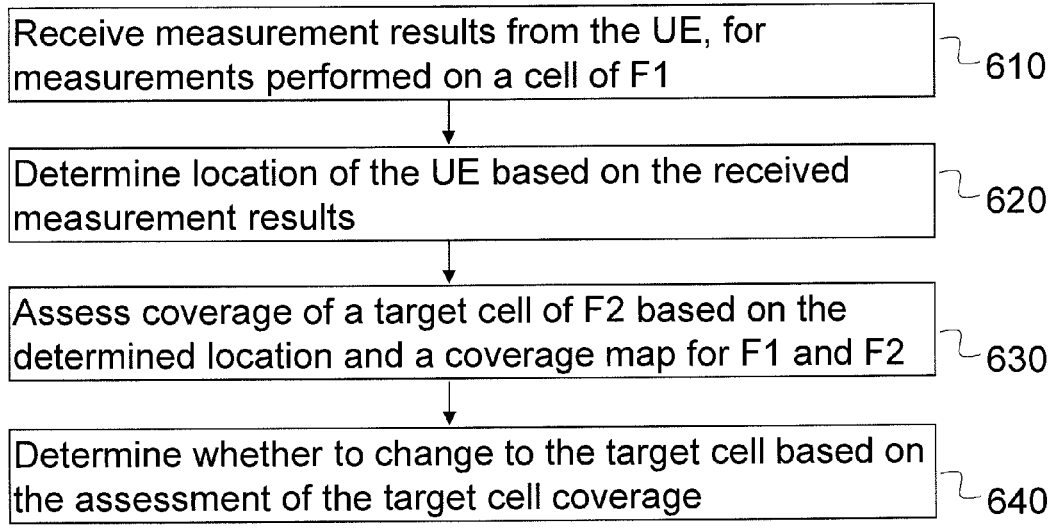
FIGS. 6a-b are flowcharts illustrating the method in a radio network node according to embodiments.
Figure 6B:
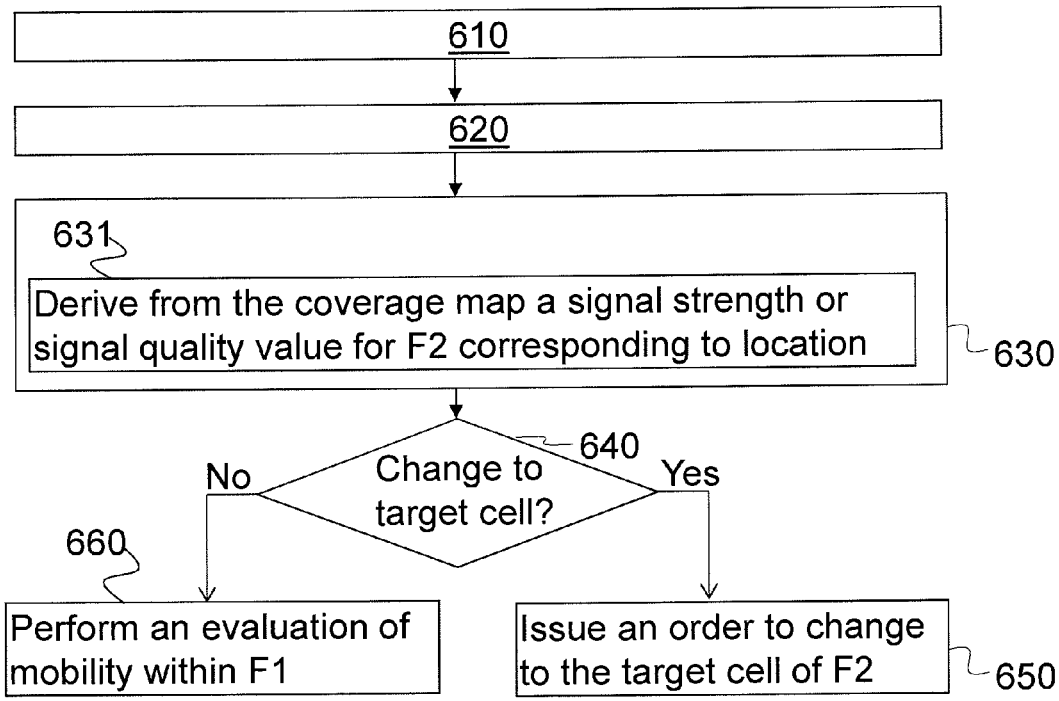

FIGS. 6a-b, illustrates the method performed in the radio network node. FIG. 6a is a flowchart illustrating a first embodiment of a method in a radio network node for supporting cell change between frequency layers. The cell change may comprise a cell reselection, a handover, or a connection release with redirection. The radio network node is part of a wireless communication network in which at least two frequency layers, F1 and F2, are deployed, e.g. as described earlier with reference to FIG. 2 or 3. The radio network node may e.g. be a NodeB in an UTRAN (see FIG. 1a). The radio network node 101 serves a UE 103 in a cell 105 of a first of the at least two frequency layers F1, the UE being configured to perform measurements on cells of the first frequency layer F1, and to exclude measurements on cells of a second of the at least two frequency layers F2. The method comprises:

610: Receiving measurement results from the UE, for measurements performed on at least one cell of the first frequency layer F1. For UTRAN, the measurement results may e.g. comprise CPICH RSCP and RSSI measurements.

620: Determining a location of the UE based on the received measurement results. A fingerprinting method may e.g. be used to determine the UE location as already described above.

630: Assessing a coverage of a target cell of the second frequency layer F2 based on the determined location and a coverage map for the at least two frequency layers. The coverage map is checked to see whether there are cells with good coverage on carrier F2 in that location.

640: Determining whether to change to the target cell based on the assessment of the target cell coverage. In an exemplary embodiment, the radio network node determines to change to the target cell when it is assessed that the target cell will be received with a quality which is equal to or above a threshold. With a quality above a certain threshold, coverage is good on F2, and if coverage is good and F2 is a prioritized carrier, a cell change may be initiated.

FIG. 6b is a flowchart illustrating another embodiment of the method in the radio network node. The step of assessing 630 the coverage of the target cell of the second frequency layer based on the determined location and the coverage map comprises deriving 631 from the coverage map a signal strength or signal quality value for the second frequency layer corresponding to the determined location. One example is a mapping between the CPICH RSCP value for the UTRA cell on carrier F1 in the UE location and the corresponding RSRP value for a E-UTRA cell on carrier F2. Deriving 631 the signal strength or signal quality value from the coverage map does in embodiments comprise receiving one of the following from a network node comprising the coverage map:

the signal strength or signal quality value for the second frequency layer, or an offset which is a function of the signal strength or signal quality value for the second frequency layer and the associated signal strength or signal quality value for the first frequency layer.

The coverage map may in the UTRAN network be maintained in the RNC, and deriving the signal strength from the coverage map would therefore involve receiving it from the RNC. By sending the offset, the signaling capacity is reduced compared to sending the actual value.

In step 640, the radio network node may e.g. determine to change to the target cell when it is assessed that the target cell will be received with a quality which is equal to or above a threshold. The method may also comprise the further step, in 660, of performing an evaluation of mobility within the first frequency layer F1 based on the measurements on the cells of the first frequency layer, when it is assessed that the target cell will be received with a quality which is below the threshold. In this case the F2 coverage is not good enough for the UE to change to the F2 carrier, and a normal intra-RAT mobility assessment may thus be performed, as already described above with reference to FIG. 5a.

When the radio network node has determined to change to the target cell, the method may comprise the further step, in 650, of issuing an order to change to the target cell.

In a scenario corresponding to scenario 3 described previously, the measured cell of the first frequency layer F1 is a primary cell and the target cell is a secondary cell in a multi-carrier network. In this embodiment, determining whether to change to the secondary cell comprises determining whether to configure the secondary cell for multicarrier operation based on the assessment of the secondary cell coverage. As explained above, this makes it possible to configure secondary cells when the UE is within coverage without having to measure them first. This is an advantage, as measuring non-configured secondary cells in some cases require a measurement gap configuration which reduces capacity.

Figure 7A:
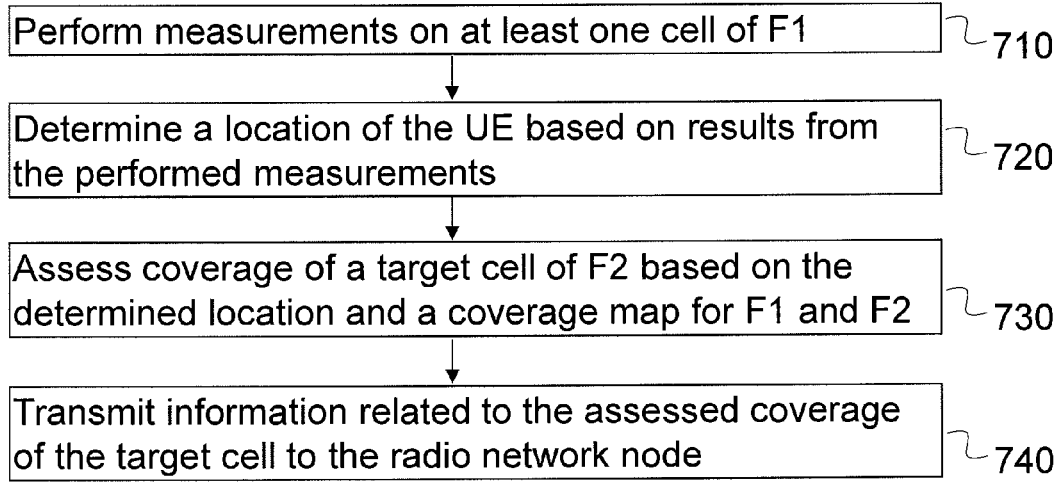
FIGS. 7a-b are flowcharts illustrating the method in a UE according to embodiments.

FIGS. 7*a-b* and FIGS. 8*a-b*, illustrates the method performed in the UE and the radio network node in cooperation. FIG. 7*a* is a flowchart illustrating one embodiment of a method for supporting cell change between frequency layers, in a UE of a wireless communication network deploying at least two frequency layers F1, F2. The UE 103 is served in a cell of a first of the at least two frequency layers F1 by a radio network node 101, and is configured to perform measurements on cells of the first frequency layer F1 and to exclude measurements on cells of a second of the at least two frequency layers F2. The method comprises:

710: Performing measurements on at least one cell of the first frequency layer F1. For UTRAN, the measurements may e.g. comprise CPICH RSCP and RSSI measurements.

720: Determining a location of the UE based on the results from the performed measurements. A fingerprinting method may e.g. be used to determine the UE location as already described above.

730: Assessing a coverage of a target cell of the second frequency layer F2 based on the determined location and a coverage map for the at least two frequency layers. The coverage map is checked to see whether there are cells with good coverage on carrier F2 in that location.

740: Transmitting information related to the assessed coverage of the target cell to the radio network node.

Figure 7B:
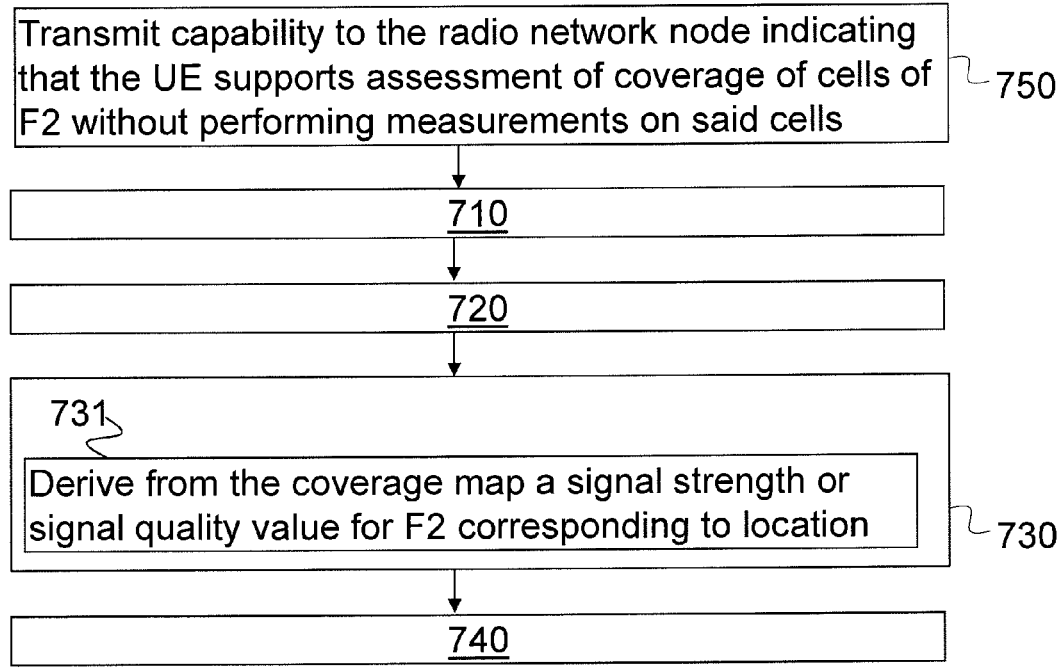

FIG. 7*b* is a flowchart illustrating another embodiment of the method in the UE. The step of assessing, in 730, the coverage of the target cell of the second frequency layer based on the determined location and the coverage map comprises deriving, in 731, from the coverage map a signal strength or signal quality value for the second frequency layer corresponding to the determined location. The coverage map may be received from the radio network node. Alternatively it may be maintained in the UE itself. The information transmitted in 740, related to the assessed coverage of the target cell, comprises in one embodiment the derived signal strength or signal quality value.

In one embodiment, the method also comprises transmitting, in 750, a capability to the radio network node, wherein the capability indicates that the UE supports assessment of coverage of cells of the second frequency layer without performing measurements on said cells. In this way, the radio network node knows that it can request the UE to perform the coverage assessment of unmeasured cells.

Figure 8A:
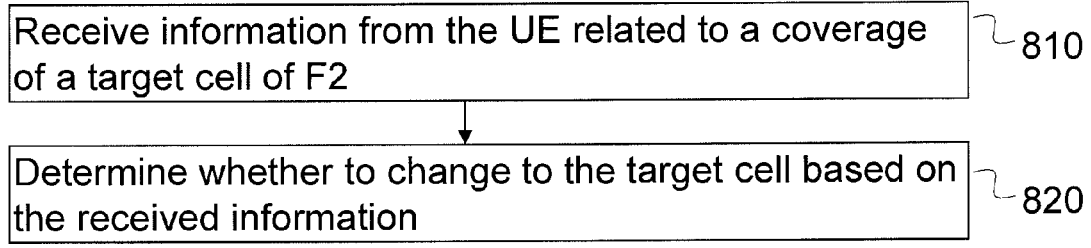
FIGS. 8a-b are flowcharts illustrating the method in a radio network node according to embodiments.

FIG. 8*a* is a flowchart illustrating one embodiment of a method for supporting cell change between frequency layers, in a radio network node of a wireless communication network deploying at least two frequency layers F1 and F2. The cell change may comprise a cell reselection, a handover, or a connection release with redirection. The radio network node serves a UE 103 in a cell of a first of the at least two frequency layers F1. The UE is configured to perform measurements on cells of the first frequency layer F1, and to exclude measurements on cells of a second of the at least two frequency layers F2. The method comprises:

810: Receiving information from the UE related to a coverage of a target cell of the second frequency layer F2. The radio network node thus receives the result from the coverage assessment performed in the UE, as described above with reference to FIG. 7*a*.

820: Determining whether to change to the target cell based on the received information.

Figure 8B:
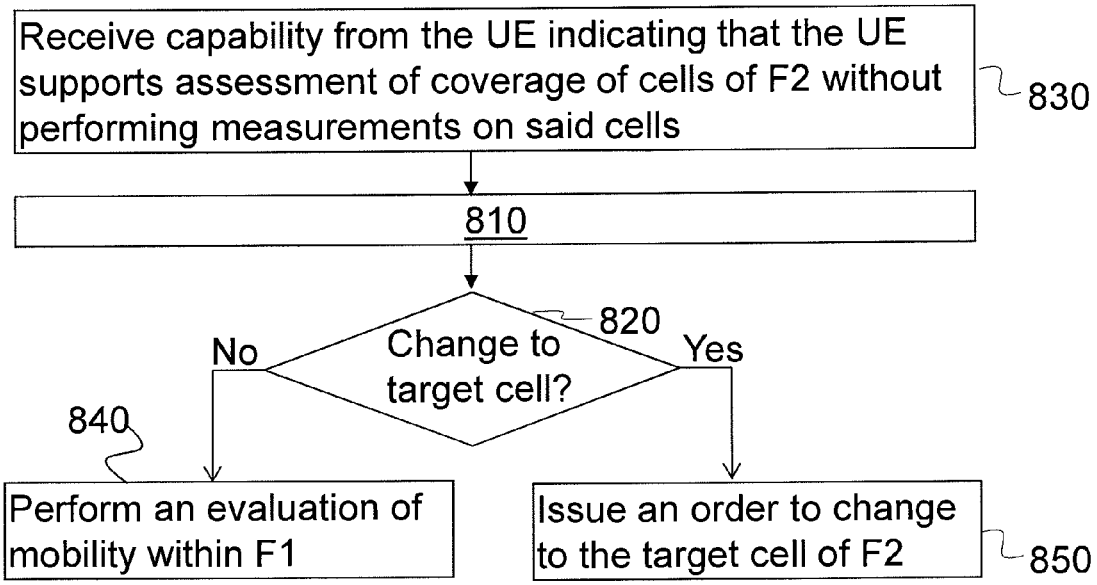

FIG. 8*b* is a flowchart illustrating another embodiment of the method in the radio network node. The method further comprises receiving, in 830, a capability from the UE. The capability indicates that the UE supports assessment of coverage of cells of the second frequency layer F2 without performing measurements on said cells. The received capability may trigger a request for information related to the coverage of the target cell to the UE. Step 820 of determining whether to change to the target cell comprises determining to change to the target cell when it is assessed that the target cell will be received with a quality which is equal to or above a threshold. When it is determined to change to the target cell, the method may further comprise issuing, in 850, an order to change to the target cell. When it is assessed that the target cell will be received with a quality which is below the threshold, and thus no change to the target cell will take place, the method comprises, in 840, performing an evaluation of mobility within the first frequency layer F1 based on the measurements on the cells of the first frequency layer.

In a scenario corresponding to scenario 3 described previously, the measured cell of the first frequency layer F1 is a primary cell and the target cell is a secondary cell in a multi-carrier network. In this embodiment, determining whether to change to the secondary cell comprises determining whether to configure the secondary cell for multicarrier operation based on the assessment of the secondary cell coverage.

Figure 9A:
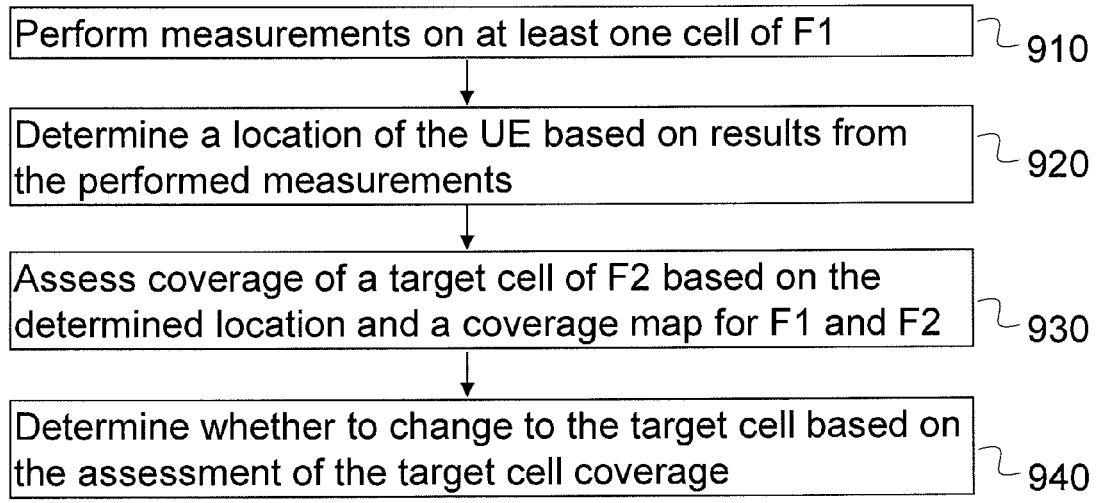
FIGS. 9a-b are flowcharts illustrating the method in an idle mode UE according to embodiments.
Figure 9B:
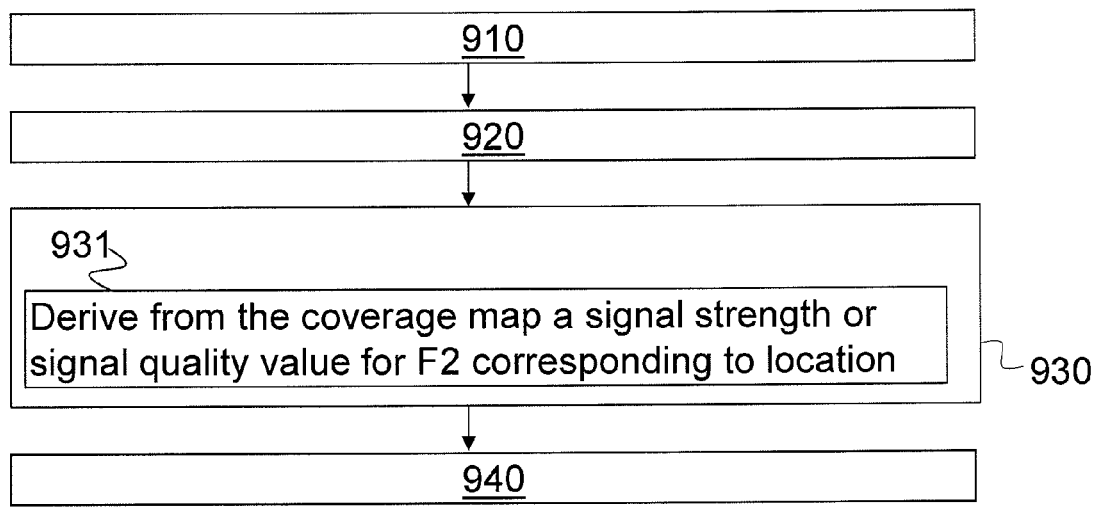

FIGS. 9*a-b*, illustrates the method performed in the UE only, when the UE is in idle mode. FIG. 9*a* is a flowchart illustrating one embodiment of a method for supporting cell change between frequency layers in a UE of a wireless communication network deploying at least two frequency layers F1 and F2. In this embodiment, the UE is camping on a cell of a first of the at least two frequency layers F1 in idle mode. The UE is configured to perform measurements on cells of the first frequency layer F1 and to exclude measurements on cells of a second of the at least two frequency layers F2. The method comprises:

910: Performing measurements on at least one cell of the first frequency layer F1.

920: Determining a location of the UE based on the results from the performed measurements. A fingerprinting method may e.g. be used to determine the UE location as already described above.

930: Assessing a coverage of a target cell of the second frequency layer based on the determined location and a coverage map for the at least two frequency layers. In one embodiment, illustrated in FIG. 9*b*, assessing the coverage of the target cell of the second frequency layer F2 comprises deriving, in 931, from the coverage map a signal strength or signal quality value for the second frequency layer corresponding to the determined location.

940: Determining whether to change to the target cell based on the assessment of the target cell coverage.

Figure 10:
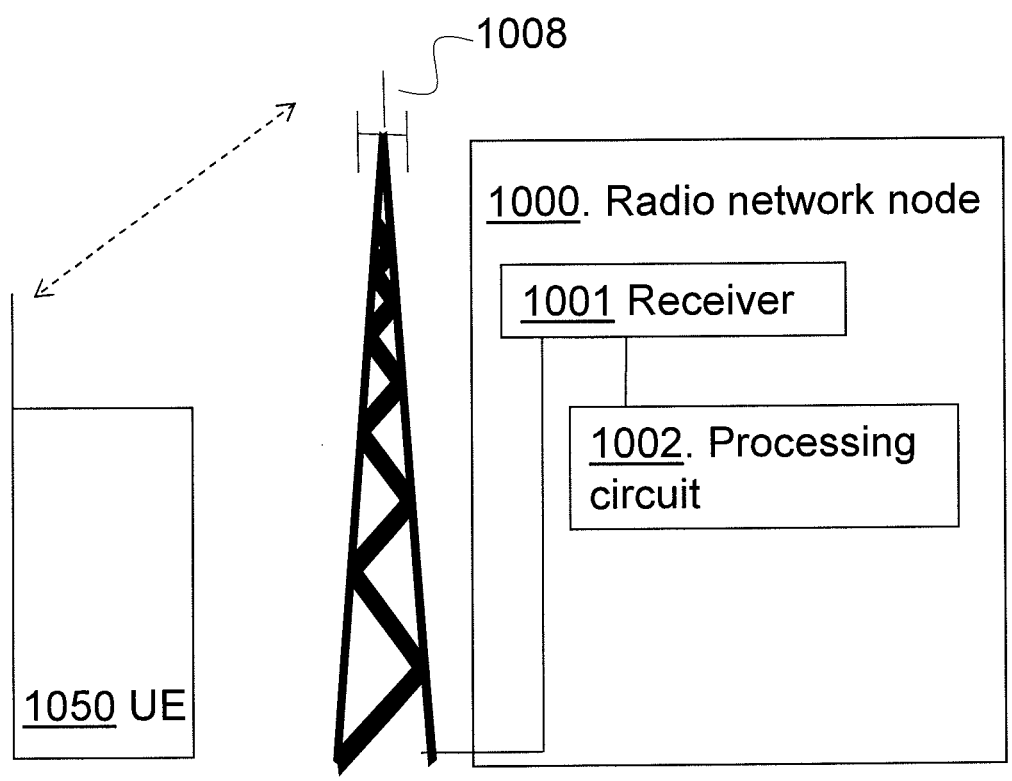
FIG. 10 is a block diagram schematically illustrating a radio network node according to embodiments.

An embodiment of a radio network node 1000 for a wireless communication network deploying at least two frequency layers is schematically illustrated in the block diagram in FIG. 10. The radio network node is configured to serve a UE 1050 in a cell of a first of the at least two frequency layers, and to support cell change between frequency layers. The cell change may comprise a cell reselection, a handover, or a connection release with redirection. The UE is configured to perform measurements on cells of the first frequency layer, and to exclude measurements on cells of a second of the at least two frequency layers. The radio network node comprises a receiver 1001 configured to receive measurement results from the UE, for measurements performed on at least one cell of the first frequency layer. The receiver 1001 may be connected via an antenna port to a same or to different receiving antennas 1008. The radio network node further comprises a processing circuit 1002 configured to determine a location of the UE based on the received measurement results, and to assess a coverage of a target cell of the second frequency layer based on the determined location and a coverage map for the at least two frequency layers. The processing circuit is also configured to determine whether to change to the target cell based on the assessment of the target cell coverage.

In one embodiment, the processing circuit 1002 is configured to assess the coverage of the target cell of the second frequency layer based on the determined location and the coverage map by deriving from the coverage map a signal strength or signal quality value for the second frequency layer corresponding to the determined location. The processing circuit 1002 may be configured to derive the signal strength or signal quality value from the coverage map by receiving one of the following from a network node comprising the coverage map:

the signal strength or signal quality value for the second frequency layer, or an offset which is a function of the signal strength or signal quality value for the second frequency layer and the associated signal strength or signal quality value for the first frequency layer.

The processing circuit 1002 is in one embodiment configured to determine to change to the target cell, when it is assessed that the target cell will be received with a quality which is equal to or above a threshold. Furthermore, the processing circuit 1002 may be configured to perform an evaluation of mobility within the first frequency layer based on the measurements on the cells of the first frequency layer, when it is assessed that the target cell will be received with a quality which is below the threshold. In another embodiment, the processing circuit 1002 may be configured to issue an order to change to the target cell, when it is determined to change to the target cell.

In an alternative embodiment, the measured cell of the first frequency layer is a primary cell and the target cell is a secondary cell in a multi-carrier network. The processing circuit 1002 is in this embodiment adapted to determine whether to configure the secondary cell for multicarrier operation based on the assessment of the secondary cell coverage.

Figure 11:
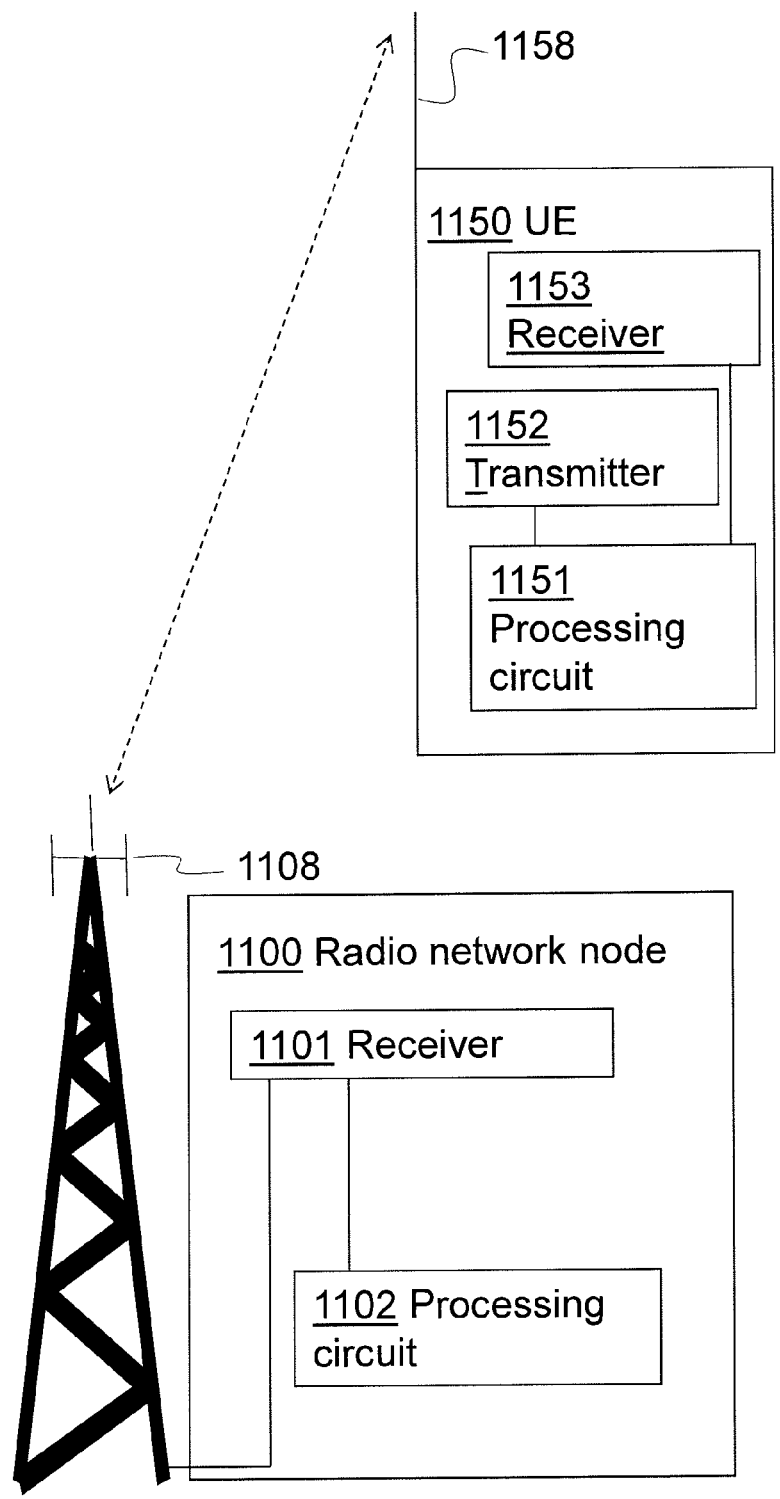
FIG. 11 is a block diagram schematically illustrating a UE and a radio network node according to embodiments.

An embodiment of a UE 1150 and a radio network node 1100 for a wireless communication network deploying at least two frequency layers are schematically illustrated in the block diagram in FIG. 11. The UE 1150 is configured to support cell change between frequency layers. The UE is further configured to be served in a cell of a first of the at least two frequency layers by a radio network node and to perform measurements on cells of the first frequency layer and to exclude measurements on cells of a second of the at least two frequency layers. The UE comprises a processing circuit 1151 configured to perform measurements on at least one cell of the first frequency layer, and to determine a location of the UE based on results from the performed measurements. The processing circuit is also configured to assess a coverage of a target cell of the second frequency layer based on the determined location and a coverage map for the at least two frequency layers. The UE further comprises a transmitter 1152 configured to transmit information related to the assessed coverage of the target cell to the radio network node. The transmitter 1152 may be connected via an antenna port to a same or to different transmitting antennas 1158.

In one embodiment, the processing circuit 1151 is configured to assess the coverage of the target cell of the second frequency layer by deriving from the coverage map a signal strength or signal quality value for the second frequency layer corresponding to the determined location. The transmitted information related to the assessed coverage of the target cell may comprise the derived signal strength or signal quality value.

In one embodiment, the processing unit 1151 is configured to maintain the coverage map in the UE. In an alternative embodiment, the UE further comprises a receiver 1153 configured to receive the coverage map from the radio network node. In this alternative embodiment, the UE need not maintain the coverage map itself.

In another embodiment, the transmitter 1152 is further configured to transmit a capability to the radio network node, wherein the capability indicates that the UE supports assessment of coverage of cells of the second frequency layer without performing measurements on said cells.

The radio network node 1100 is configured to serve the UE 1152 in a cell of a first of the at least two frequency layers and to support cell change between frequency layers. The cell change may comprise a cell reselection, a handover, or a connection release with redirection. The UE is configured to perform measurements on cells of the first frequency layer, and to exclude measurements on cells of a second of the at least two frequency layers. The radio network node comprises a receiver 1101 configured to receive information from the UE related to a coverage of a target cell of the second frequency layer, and a processing circuit 1102 configured to determining whether to change to the target cell based on the received information. The receiver 1101 may be connected via an antenna port to a same or to different receiving antennas 1108.

The receiver 1101 is in one embodiment further configured to receive a capability from the UE, wherein the capability indicates that the UE supports assessment of coverage of cells of the second frequency layer without performing measurements on said cells. The processing unit 1102 may be configured to request information related to the coverage of the target cell to the UE, triggered by the received capability.

In another embodiment, the processing circuit 1102 is configured to determine to change to the target cell when it is assessed that the target cell will be received with a quality which is equal to or above a threshold. The processing circuit 1102 may be further configured to perform an evaluation of mobility within the first frequency layer based on the measurements on the cells of the first frequency layer, when it is assessed that the target cell will be received with a quality which is below the threshold. In still another embodiment, the processing circuit 1102 is further configured to issue an order to change cell when it is determined to change to the target cell.

In an alternative embodiment, the measured cell of the first frequency layer is a primary cell and the target cell is a secondary cell in a multi-carrier network. In this alternative embodiment, the processing circuit 1102 is adapted to determine whether to configure the secondary cell for multicarrier operation based on the assessment of the secondary cell coverage.

Figure 12:
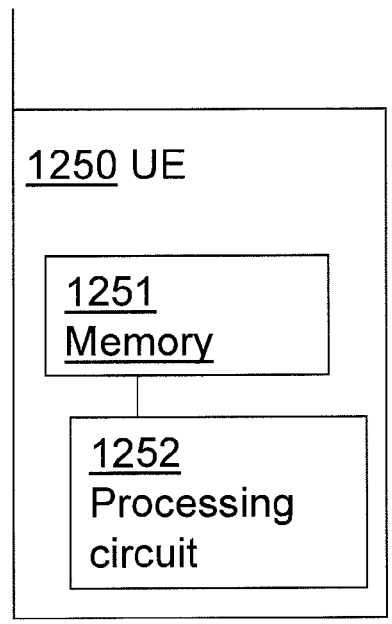
FIG. 12 is a block diagram schematically illustrating a UE according to embodiments.

An embodiment of a UE 1250 for a wireless communication network deploying at least two frequency layers is schematically illustrated in the block diagram in FIG. 12. The UE is configured to support cell change between frequency layers, to camp on a cell of a first of the at least two frequency layers in idle mode, and to perform measurements on cells of the first frequency layer and exclude measurements on cells of a second of the at least two frequency layers. The UE comprises a memory 1251 and a processing circuit 1252 configured to perform measurements on at least one cell of the first frequency layer, and to determine a location of the UE based on results from the performed measurements. The processing circuit 1252 is also configured to assess a coverage of a target cell of the second frequency layer based on the determined location and a coverage map for the at least two frequency layers, and to determine whether to change to the target cell based on the assessment of the target cell coverage. In one embodiment, the processing circuit 1252 is configured to assess the coverage of the target cell of the second frequency layer by deriving from the coverage map a signal strength or signal quality value for the second frequency layer corresponding to the determined location.

In view of the above discussion, it will be appreciated that embodiments of the above-described embodiments of the invention include methods performed at one or more nodes in a network, such as at an LTE eNodeB, for determining the coverage available to a UE from an unmeasured cell of one frequency layer, based on measurements of cells of other frequency layers. Various instances of these methods may also include steps communicating measurement data or mapping data from one node to another, again for the purpose of determining the coverage available to a UE from an unmeasured cell. As mentioned above, one or more of these methods may be based on measurement data received from the mobile terminals or UEs, including signal strength measurements, timing measurements, and the like, and may alternatively and/or also depend on identification by the UEs of well-heard transmission points. It will also be appreciated that the several techniques described above, as well as their sub-processes, can be used in any combination unless it is obvious that that those techniques or sub-processes are inherently incompatible with one another. Other embodiments include similar methods performed at a UE. Still other embodiments include wireless node apparatus, such as a base station, and UE apparatus corresponding to the methods and techniques described above.

Figure 13:
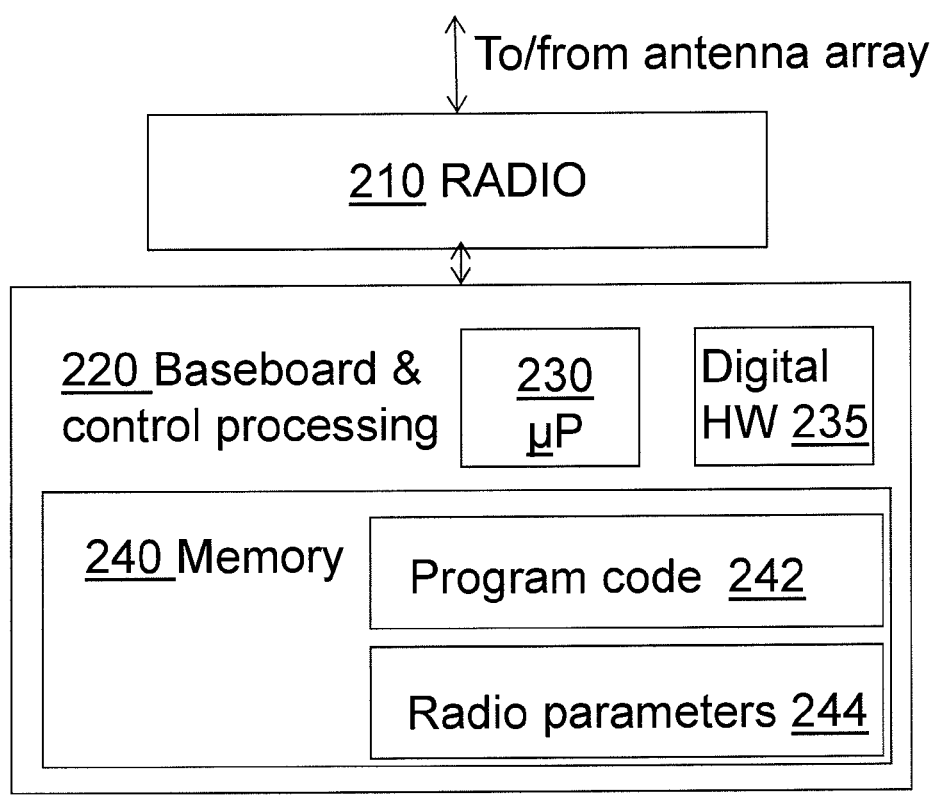
FIG. 13 is a block diagram schematically illustrating a wireless transceiver apparatus with components relevant to embodiments of the present invention, as realized in either a UE or a radio base station.

In some cases, the methods described above will be implemented in a wireless transceiver apparatus such as the one pictured in FIG. 13, which illustrates a few of the components relevant to the present techniques, as realized in either a UE or a base station. Of course, it will be appreciated that a network-based implementation need not be limited to a base station implementation, thus other radio network node apparatus configured to carry out the techniques described above are also possible.

The apparatus illustrated in FIG. 13 includes radio circuitry 210 and baseband & control processing circuit 220. Radio circuitry 210 includes receiver circuits and transmitter circuits that use known radio processing and signal processing components and techniques, typically according to a particular telecommunications standard such as the 3GPP standard for LTE-Advanced. Because the various details and engineering tradeoffs associated with the design of such circuitry are well known and are unnecessary to a full understanding of the invention, additional details are not shown here.

Baseband & control processing circuit 220 includes one or more microprocessors or microcontrollers 230, as well as other digital hardware 235, which may include Digital Signal Processors (DSPs), special-purpose digital logic, and the like. Either or both of microprocessor(s) 230 and digital hardware may be configured to execute program code 242 stored in memory 240, along with radio parameters 244. Again, because the various details and engineering tradeoffs associated with the design of baseband processing circuitry for UEs and wireless base stations are well known and are unnecessary to a full understanding of the invention, additional details are not shown here The program code 242 stored in memory circuit 240, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 244 may include one or more pre-determined tables or other data for supporting these techniques, in some embodiments.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention.

The invention claimed is:

1. A method in a radio network node of a wireless communication network deploying at least two frequency layers, wherein the radio network node serves a user equipment in a cell of a first of the at least two frequency layers, the user equipment configured to perform measurements on cells of the first frequency layer, and to exclude measurements on cells of a second of the at least two frequency layers, the method for supporting cell change between frequency layers and comprising:
    receiving measurement results from the user equipment, for measurements performed on at least one cell of the first frequency layer;
    determining a location of the user equipment based on the received measurement results;
    assessing a coverage of a target cell of the second frequency layer based on the determined location and a coverage map for the at least two frequency layers;
    determining whether to change to the target cell based on the assessment of the target cell coverage.

2. The method of claim 1, wherein the assessing the coverage of the target cell comprises deriving, from the coverage map, a signal strength or signal quality value for the second frequency layer corresponding to the determined location.

3. The method of claim 2, wherein the deriving comprises receiving one of the following from a network node comprising the coverage map:
    the signal strength or signal quality value for the second frequency layer; or
    an offset which is a function of the signal strength or signal quality value for the second frequency layer and the associated signal strength or signal quality value for the first frequency layer.

4. The method of claim 1, wherein the determining whether to change to the target cell comprises determining to change to the target cell when it is assessed that the target cell will be received with a quality which is equal to or above a threshold.

5. The method of claim 4, further comprising, in response to the assessing indicating that the target cell will be received with a quality which is below the threshold, performing an evaluation of mobility within the first frequency layer based on the measurements on the cells of the first frequency layer.

6. The method of claim 1, further comprising issuing an order to change to the target cell when it is determined to change to the target cell.

7. The method of claim 1, wherein the cell change comprises a cell reselection, a handover, or a connection release with redirection.

8. The method of claim 1:
wherein the at least one cell of the first frequency layer for which measurement results are received is a primary cell and the target cell is a secondary cell in a multi-carrier network;
wherein the determining whether to change to the target cell comprises determining whether to configure the secondary cell for multicarrier operation based on the assessment of the secondary cell coverage.

9. A method in a user equipment of a wireless communication network deploying at least two frequency layers, wherein the user equipment is served in a cell of a first of the at least two frequency layers by a radio network node and is configured to perform measurements on cells of the first frequency layer and to exclude measurements on cells of a second of the at least two frequency layers, the method for supporting cell change between frequency layers and comprising:
performing measurements on at least one cell of the first frequency layer;
determining a location of the user equipment based on results from the performed measurements;
assessing a coverage of a target cell of the second frequency layer based on the determined location and a coverage map for the at least two frequency layers; and
transmitting information related to the assessed coverage of the target cell to the radio network node.

10. The method of claim 9, wherein the assessing the coverage of the target cell comprises deriving, from the coverage map, a signal strength or signal quality value for the second frequency layer corresponding to the determined location.

11. The method of claim 10, wherein the information related to the assessed coverage of the target cell comprises the derived signal strength or signal quality value.

12. The method of claim 9, wherein the coverage map is received from the radio network node, or is maintained in the user equipment.

13. The method of claim 9:
further comprising transmitting a capability to the radio network node;
wherein the capability indicates that the user equipment supports assessment of coverage of cells of the second frequency layer without performing measurements on those cells.

14. A method in a user equipment of a wireless communication network deploying at least two frequency layers, wherein the user equipment is camping on a cell of a first of the at least two frequency layers in idle mode and is configured to perform measurements on cells of the first frequency layer and to exclude measurements on cells of a second of the at least two frequency layers, the method for supporting cell change between frequency layers and comprising:
performing measurements on at least one cell of the first frequency layer;
determining a location of the user equipment based on results from the performed measurements;
assessing a coverage of a target cell of the second frequency layer based on the determined location and a coverage map for the at least two frequency layers;
determining whether to change to the target cell based on the assessment of the target cell coverage.

15. The method of claim 14, wherein the assessing the coverage of the target cell comprises deriving, from the coverage map, a signal strength or signal quality value for the second frequency layer corresponding to the determined location.

16. A radio network node for a wireless communication network deploying at least two frequency layers, wherein the radio network node is configured to serve a user equipment in a cell of a first of the at least two frequency layers, and to support cell change between frequency layers, the user equipment being configured to perform measurements on cells of the first frequency layer, and to exclude measurements on cells of a second of the at least two frequency layers, the radio network node comprising:
a receiver configured to receive measurement results from the user equipment, for measurements performed on at least one cell of the first frequency layer;
a processing circuit configured to:
determine a location of the user equipment based on the received measurement results;
assess a coverage of a target cell of the second frequency layer based on the determined location and a coverage map for the at least two frequency layers; and
determine whether to change to the target cell based on the assessment of the target cell coverage.

17. The radio network node of claim 16, wherein the processing circuit is configured to assess the coverage of the target cell by deriving from the coverage map a signal strength or signal quality value for the second frequency layer corresponding to the determined location.

18. The radio network node of claim 17, wherein the processing circuit is configured to derive the signal strength or signal quality value from the coverage map by receiving one of the following from a network node comprising the coverage map:
the signal strength or signal quality value for the second frequency layer; or
an offset which is a function of the signal strength or signal quality value for the second frequency layer and the associated signal strength or signal quality value for the first frequency layer.

19. The radio network node of claim 16, wherein the processing circuit is configured to determine to change to the target cell when it is assessed that the target cell will be received with a quality which is equal to or above a threshold.

20. The radio network node of claim 16, wherein the processing circuit is further configured to, in response to it being assessed that that the target cell will be received with a quality which is below the threshold, perform an evaluation of mobility within the first frequency layer based on the measurements on the cells of the first frequency layer.

21. The radio network node of claim 16, wherein the processing circuit is configured to issue an order to change to the target cell when it is determined to change to the target cell.

22. The radio network node of claim 16, wherein the cell change comprises a cell reselection, a handover, or a connection release with redirection.

23. The radio network node of claim 16:
wherein the at least one cell of the first frequency layer for which measurement results are received is a primary cell and the target cell is a secondary cell in a multi-carrier network;
wherein the processing circuit is adapted to determine whether to configure the secondary cell for multicarrier operation based on the assessment of the secondary cell coverage.

24. A user equipment for a wireless communication network deploying at least two frequency layers, wherein the user equipment is configured to support cell change between frequency layers, and is further configured to be served in a cell of a first of the at least two frequency layers by a radio network node, and to perform measurements on cells of the first frequency layer and to exclude measurements on cells of a second of the at least two frequency layers, the user equipment comprising:
a processing circuit configured to:
perform measurements on at least one cell of the first frequency layer;
determine a location of the user equipment based on results from the performed measurements;
assess a coverage of a target cell of the second frequency layer based on the determined location and a coverage map for the at least two frequency layers;
a transmitter configured to transmit information related to the assessed coverage of the target cell to the radio network node.

25. The user equipment of claim 24, wherein the processing circuit is configured to assess the coverage of the target cell by deriving, from the coverage map, a signal strength or signal quality value for the second frequency layer corresponding to the determined location.

26. The user equipment of claim 25, wherein the transmitted information related to the assessed coverage of the target cell comprises the derived signal strength or signal quality value.

27. The user equipment of claim 24, wherein:
the processing unit is further configured to maintain the coverage map in the user equipment; or
the user equipment further comprises a receiver configured to receive the coverage map from the radio network node.

28. The user equipment of claim 24:
wherein the transmitter is further configured to transmit a capability to the radio network node;
wherein the capability indicates that the user equipment supports assessment of coverage of cells of the second frequency layer without performing measurements on those cells.

29. A user equipment for a wireless communication network deploying at least two frequency layers, wherein the user equipment is configured to support cell change between frequency layers, to camp on a cell of a first of the at least two frequency layers in idle mode, and to perform measurements on cells of the first frequency layer and exclude measurements on cells of a second of the at least two frequency layers, the user equipment comprising:
a memory having a coverage map for the at least two frequency layers stored therein;
a processing circuit configured to:
perform measurements on at least one cell of the first frequency layer;
determine a location of the user equipment based on results from the performed measurements;
assess a coverage of a target cell of the second frequency layer based on the determined location and the coverage map; and
determine whether to change to the target cell based on the assessment of the target cell coverage.

30. The user equipment of claim 29, wherein the processing circuit is configured to assess the coverage of the target cell by deriving from the coverage map a signal strength or signal quality value for the second frequency layer corresponding to the determined location.

* * * * *